United States Patent
Chang et al.

(10) Patent No.: US 10,336,021 B2
(45) Date of Patent: Jul. 2, 2019

(54) IMAGING LENS ELEMENT, CAMERA MODULE, AND ELECTRONIC DEVICE

(71) Applicant: LARGAN PRECISION CO., LTD., Taichung (TW)

(72) Inventors: Ming-Shun Chang, Taichung (TW); Ming-Ta Chou, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 15/895,107

(22) Filed: Feb. 13, 2018

(65) Prior Publication Data
US 2019/0126575 A1    May 2, 2019

(30) Foreign Application Priority Data

Oct. 27, 2017 (TW) .............................. 106137203 A

(51) Int. Cl.
| | | |
|---|---|---|
| *G02B 3/02* | (2006.01) | |
| *B29D 11/00* | (2006.01) | |
| *G02B 3/04* | (2006.01) | |
| *G02B 27/64* | (2006.01) | |
| *G02B 7/09* | (2006.01) | |
| *G02B 13/00* | (2006.01) | |

(52) U.S. Cl.
CPC .......... *B29D 11/00019* (2013.01); *G02B 3/04* (2013.01); *G02B 7/09* (2013.01); *G02B 13/0025* (2013.01); *G02B 27/646* (2013.01)

(58) Field of Classification Search
CPC ............................................... B29D 11/00019
USPC ......................................................... 359/718
See application file for complete search history.

(56) References Cited

U.S. PATENT DOCUMENTS

| | | |
|---|---|---|
| 6,034,827 A | 3/2000 | Nomura et al. |
| 6,078,430 A | 6/2000 | Fukuda et al. |
| 6,466,376 B1 | 10/2002 | Koshimizu et al. |
| 7,151,640 B2 | 12/2006 | Sawagami et al. |
| 8,824,066 B2 | 9/2014 | Weng |
| 8,947,795 B2 | 2/2015 | Kobayashi et al. |
| 8,964,313 B2 | 2/2015 | Kobayashi et al. |
| 2009/0213476 A1 | 8/2009 | Takumi et al. |
| 2012/0224267 A1 | 9/2012 | Kikuchi et al. |
| 2017/0293103 A1* | 10/2017 | Shinohara ................ G02B 7/02 |

FOREIGN PATENT DOCUMENTS

| | | |
|---|---|---|
| TW | 200843932 A | 11/2008 |
| TW | M468400 U | 12/2013 |
| TW | 201402301 A | 1/2014 |

* cited by examiner

*Primary Examiner* — James C. Jones
(74) *Attorney, Agent, or Firm* — McClure, Qualey & Rodack, LLP

(57) ABSTRACT

An imaging lens element includes an optical effective section, an outer diameter surface, at least two cut traces and at least two clearance surfaces. The optical effective section has an optical axis. The outer diameter surface surrounds the optical effective section. Each of the cut traces is shrunk from an outer diameter reference plane of the outer diameter surface toward a center of the imaging lens element. The clearance surfaces are connected between each of the cut traces and the outer diameter surface, respectively. At least one of the cut traces includes a first surface, and a curvature center of the first surface is closer to the center of the imaging lens element than the first surface to the center of the imaging lens element thereto.

30 Claims, 37 Drawing Sheets

IMAGING LENS ELEMENT, CAMERA MODULE, AND ELECTRONIC DEVICE

RELATED APPLICATIONS

This application claims priority to Taiwan Application Serial Number 106137203, filed Oct. 27, 2017, which is herein incorporated by reference.

BACKGROUND

Technical Field

The present disclosure relates to an imaging lens element and a camera module. More particularly, the present disclosure relates to an imaging lens element, a camera module, and an electronic device that can prevent molding defects appeared within optical effective sections.

Description of Related Art

With the popularization of personal electronic products and mobile communication products having imaging devices, such as mobile phones and tablets, compact imaging lens modules have been correspondingly raised, and the demands of miniaturized imaging lens modules with high resolution and great image quality have significantly increased as well. However, image quality of imaging lens element may be affected by molding defects.

FIG. 1 is a perfusion schematic view of a molding article of a conventional imaging lens element 100. In FIG. 1, the molding article is perfused from an injecting inlet 110 into an imaging lens element 100 along a direction D1. Because the imaging lens element 100 is not disposed an outlet for releasing the molding article, a welding line 120 of the imaging lens element 100 is easy to appear within an optical effective section 130 thereof, thus it is unfavorable for the light converging condition of the imaging lens element 100 so as to reduce the image resolution correspondingly. Furthermore, when the imaging light passes through the welding line 120 or other molding defects, original path of the imaging light cannot be maintained so that an image would be fuzzier.

Therefore, to people having ordinary skills in the art, there is a need for a technical method to prevent molding defects (such as the welding line 120) appeared in the optical effective section 130 thereof. Accordingly, the image quality of the imaging lens element can be maintained, so that the imaging lens element is suitable for applied in a camera module with high optical specifications.

SUMMARY

According to one aspect of the present disclosure, an imaging lens element includes an optical effective section, an outer diameter surface, at least two cut traces and at least two clearance surfaces. The optical effective section has an optical axis. The outer diameter surface surrounds the optical effective section. Each of the cut traces is shrunk from an outer diameter reference plane of the outer diameter surface toward a center of the imaging lens element. The clearance surfaces are connected between each of the cut traces and the outer diameter surface, respectively. At least one of the cut traces includes a first surface, and a curvature center of the first surface is closer to the center of the imaging lens element than the first surface to the center of the imaging lens element thereto. Each of the cut traces has a surface center, a first connecting line is defined between the surface center of one of the cut traces and the optical axis, a second connecting line is defined between the surface center of another of the cut traces and the optical axis, each of the first connecting line and the second connecting line is perpendicular to the optical axis, an angle between the first connecting line and the second connecting line is θ1, a curvature radius of the first surface is r, a curvature radius of the outer diameter surface is R, and the following conditions are satisfied:

$$0.60 < r/R < 1.35; \text{ and}$$

$$90 \text{ degrees} < \theta1 \leq 180 \text{ degrees}.$$

According to another aspect of the present disclosure, a camera module includes the imaging lens element according to the aforementioned aspect.

According to another aspect of the present disclosure, an electronic device includes the camera module according to the aforementioned aspect and an image sensor disposed on an image surface of the camera module.

According to another aspect of the present disclosure, an imaging lens element includes an optical effective section, an outer diameter surface, at least two cut traces and at least two clearance surfaces. The optical effective section has an optical axis. The outer diameter surface surrounds the optical effective section. Each of the cut traces is shrunk from an outer diameter reference plane of the outer diameter surface toward a center of the imaging lens element. The clearance surfaces are connected between each of the cut traces and the outer diameter surface, respectively. Each of the cut traces has a surface center, a first connecting line is defined between the surface center of one of the cut traces and the optical axis, a second connecting line is defined between the surface center of another of the cut traces and the optical axis, each of the first connecting line and the second connecting line is perpendicular to the optical axis, and an angle between the first connecting line and the second connecting line is θ1. A diameter of the outer diameter surface is φ, a central thickness of the imaging lens element is CT, a maximum thickness of the imaging lens element in a peripheral region thereof is ETmax, a vertical distance between a position of the maximum thickness and the optical axis is (φETmax/2), and the following conditions are satisfied:

$$0.20\phi < \phi ETmax < 0.80\phi;$$

$$1.0 < ETmax/CT < 4.5; \text{ and}$$

$$90 \text{ degrees} < \theta1 \leq 180 \text{ degrees}.$$

According to another aspect of the present disclosure, a camera module includes the imaging lens element according to the aforementioned aspect.

According to another aspect of the present disclosure, an electronic device includes the camera module according to the aforementioned aspect and an image sensor disposed on an image surface of the camera module.

According to another aspect of the present disclosure, an imaging lens element includes an optical effective section, an outer diameter surface, at least two cut traces and at least two clearance surfaces. The optical effective section has an optical axis. The outer diameter surface surrounds the optical effective section. Each of the cut traces is shrunk from an outer diameter reference plane of the outer diameter surface toward a center of the imaging lens element. The clearance surfaces are connected between each of the cut traces and the outer diameter surface, respectively. The optical effective section includes a surface being from concave in a paraxial region thereof to convex in a peripheral region thereof. A diameter of the outer diameter surface is φ, a maximum thickness of the imaging lens element in a peripheral region thereof is ETmax, a vertical distance between a position of the maximum thickness and the optical axis is (φETmax/2), and the following condition is satisfied:

$$0.20\phi < \phi ETmax < 0.80\phi.$$

According to another aspect of the present disclosure, a camera module includes the imaging lens element according to the aforementioned aspect.

According to another aspect of the present disclosure, an electronic device includes the camera module according to the aforementioned aspect and an image sensor disposed on an image surface of the camera module.

BRIEF DESCRIPTION OF THE DRAWINGS

The present disclosure can be more fully understood by reading the following detailed description of the embodiment, with reference made to the accompanying drawings as follows.

DETAILED DESCRIPTION

1st Embodiment

Figure 1:
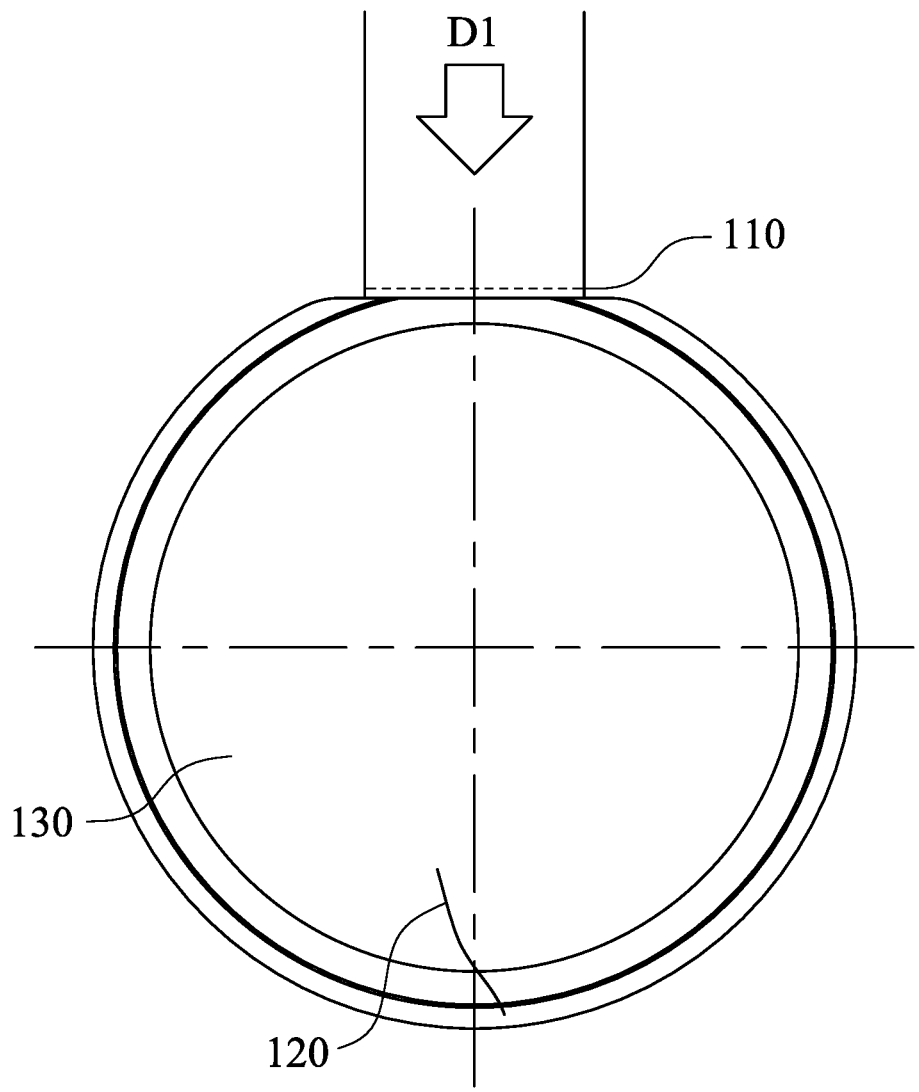
FIG. 1 is a perfusion schematic view of a molding article of a conventional imaging lens element.
Figure 2A:
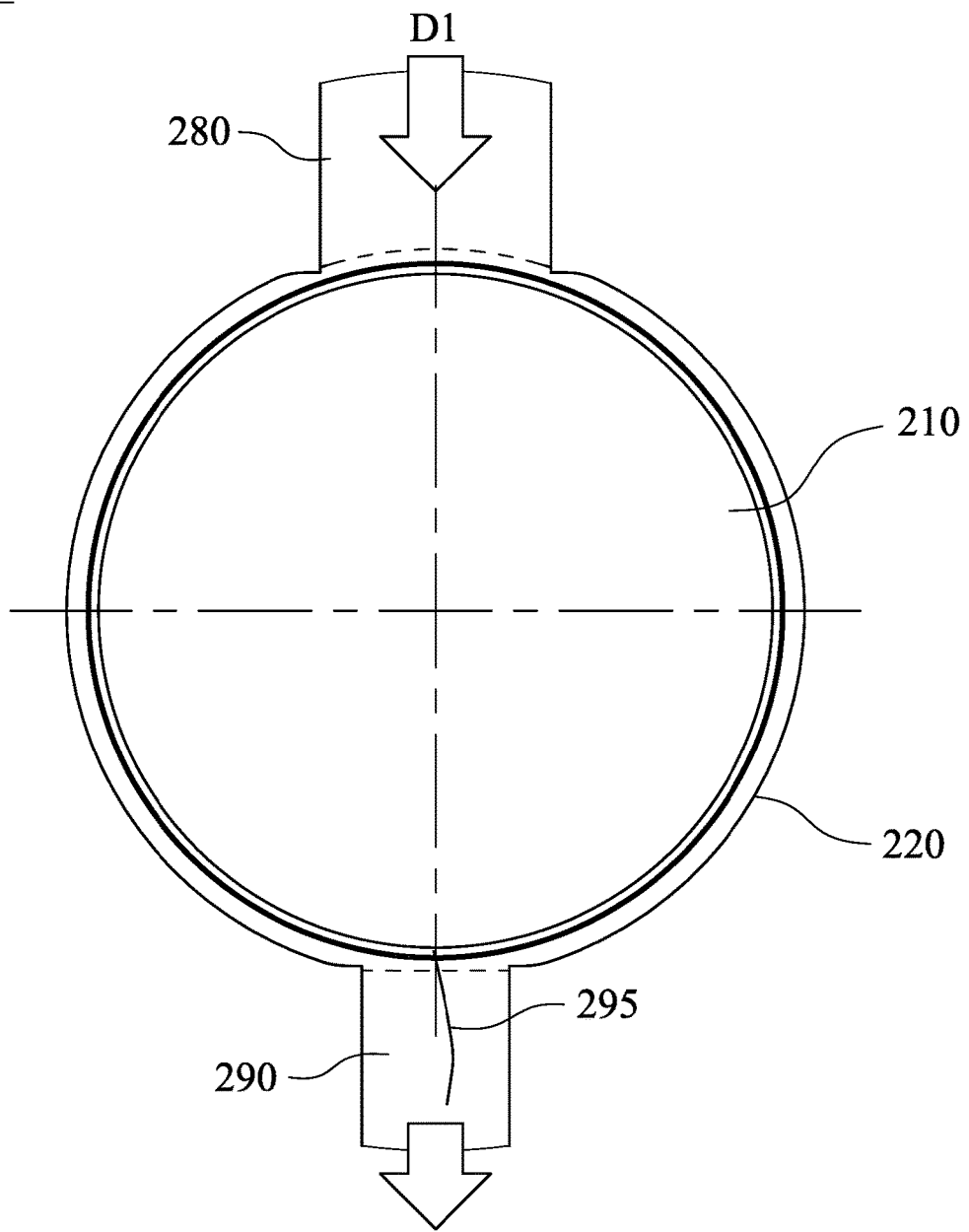
FIG. 2A is a perfusion schematic view of a molding article of an imaging lens element according to the 1st embodiment of the present disclosure.

FIG. 2A is a perfusion schematic view of a molding article of an imaging lens element 200 according to the 1st embodiment of the present disclosure. As shown in FIG. 2A, the molding article can be perfused from an injection inlet 280 into the imaging lens element 200 along a direction D1. Since the redundant molding article can flow out to an overflow area 290, the molding defects, such as a welding line 295 etc., will not appear within an optical effective section 210. Furthermore, the imaging lens element 200 can be made by a single-molded process, and the imaging lens element 200 can include only one injection inlet 280. Therefore, a number of the welding line 295 can be controlled to be least so as to improve the quality of molding.

Figure 2B:
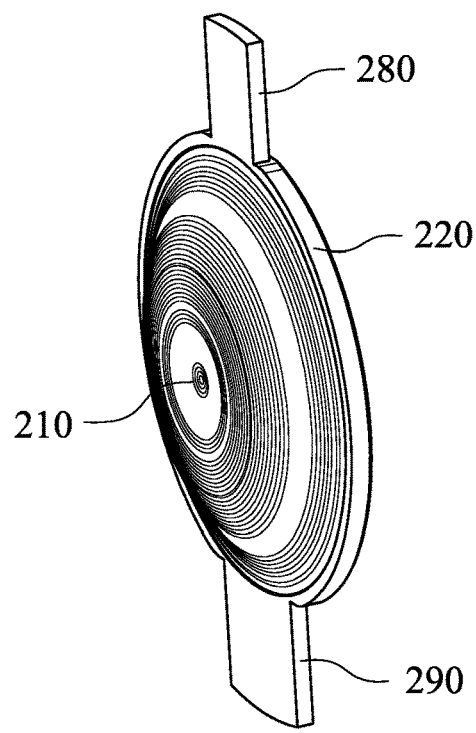
FIG. 2B is a schematic view of the imaging lens element of the 1st embodiment after molding but not removing an injection inlet and an overflow area.
Figure 2C:
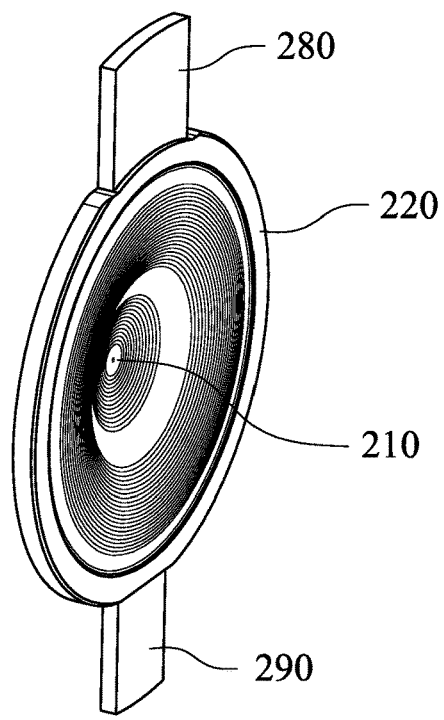
FIG. 2C is another schematic view of the imaging lens element of the 1st embodiment after molding but not removing the injection inlet and the overflow area.

FIG. 2B is a schematic view of the imaging lens element 200 of the 1st embodiment after molding but not removing the injection inlet 280 and the overflow area 290. FIG. 2C is another schematic view of the imaging lens element 200 of the 1st embodiment after molding but not removing the injection inlet 280 and the overflow area 290. In FIG. 2B and FIG. 2C, positions of the injection inlet 280 and the overflow area 290 can be understood, and the injection inlet 280 and the overflow area 290 can be cut off so as to leave corresponding cut traces on an outer diameter surface 220. The details are shown below.

Figure 2D:
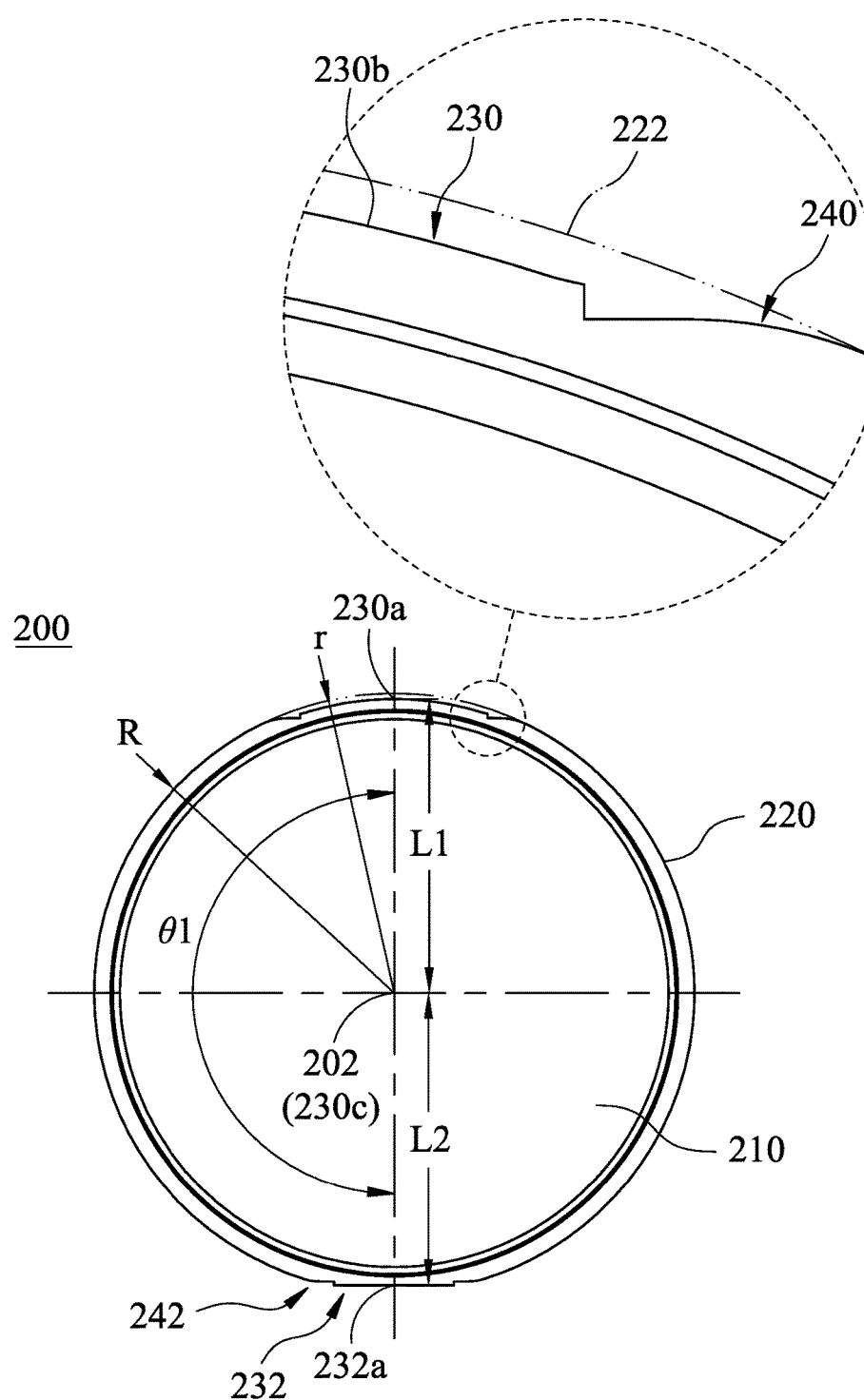
FIG. 2D is a schematic view of the imaging lens element according to the 1st embodiment of the present disclosure.
Figure 2E:
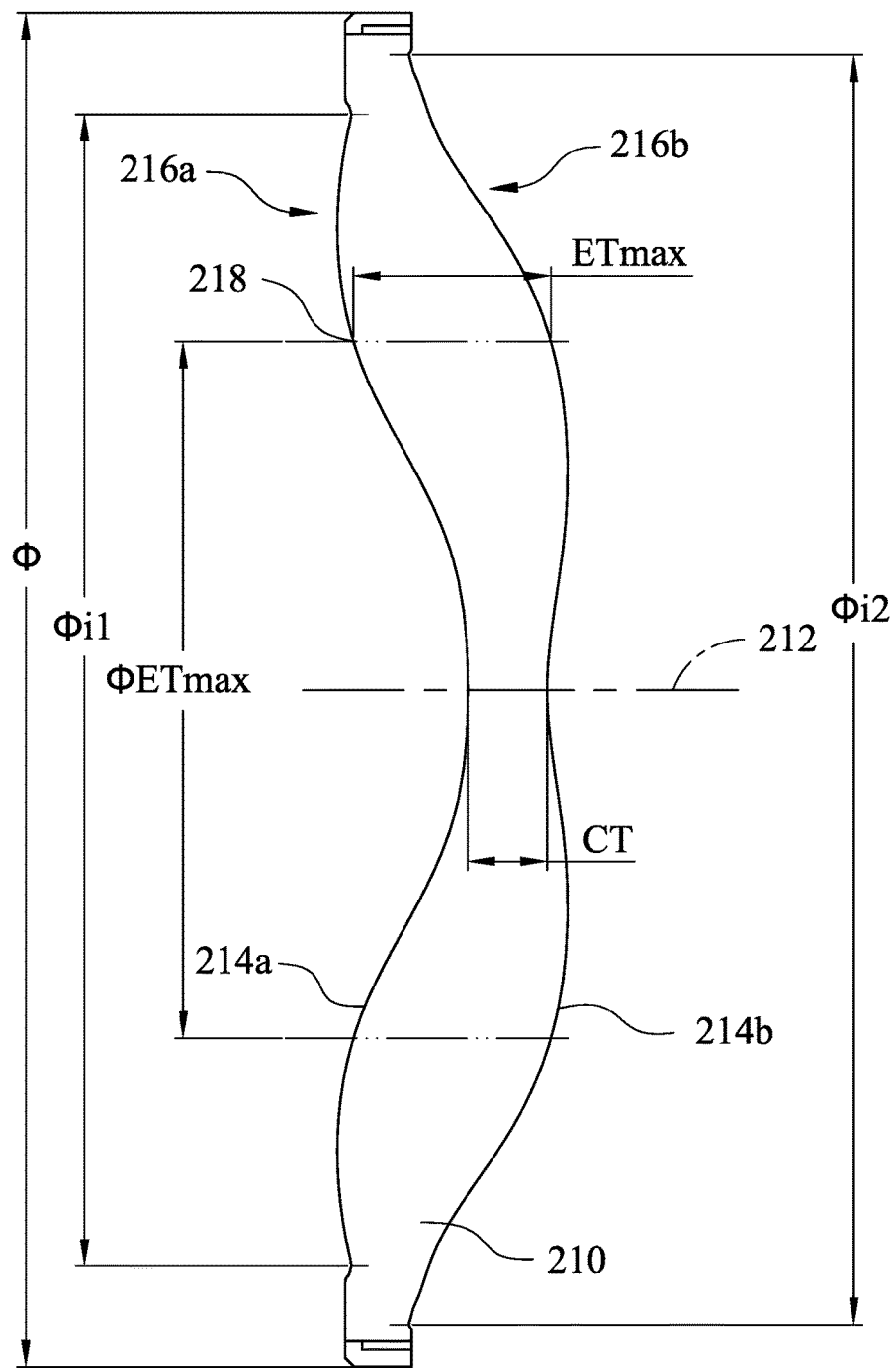
FIG. 2E is a cross-sectional view of the imaging lens element according to the 1st embodiment of the present disclosure.

FIG. 2D is a schematic view of the imaging lens element 200 according to the 1st embodiment of the present disclosure. FIG. 2E is a cross-sectional view of the imaging lens element 200 according to the 1st embodiment of the present disclosure. As shown as FIG. 2D and FIG. 2E, the imaging lens element 200 of the 1st embodiment includes the optical effective section 210, the outer diameter surface 220, a cut trace 230, a cut trace 232, a clearance surface 240 and a clearance surface 242. The optical effective section 210 has an optical axis 212. The outer diameter surface 220 surrounds the optical effective section 210. Each of the cut trace 230 and the cut trace 232 is shrunk from an outer diameter reference plane 222 of the outer diameter surface 220 toward a center 202 (which is corresponding to the optical axis 212) of the imaging lens element 200. The clearance surface 240 is connected between the cut trace 230 and the outer diameter surface 220, and the clearance surface 242 is connected between the cut trace 232 and the outer diameter surface 220. The cut trace 230 includes a first surface 230$b$, wherein a curvature center 230$c$ of the first surface 230$b$ is closer to the center 202 of the imaging lens element 200 than the first surface 230$b$ thereto. The cut trace 230 has a surface center 230$a$, and the cut trace 232 has a surface center 232$a$. A first connecting line L1 is defined between the surface center 230$a$ of the cut trace 230 and the optical axis 212, a second connecting line L2 is defined between the surface center 232$a$ of the cut trace 232 and the optical axis 212, and each of the first connecting line L1 and the second connecting line L2 is perpendicular to the optical axis 212. When an angle between the first connecting line L1 and the second connecting line L2 is θ1, a curvature radius of the first surface 230$b$ is r, and a curvature radius of the outer diameter surface 220 is R, the following conditions are satisfied: 0.60<r/R<1.35; and 90 degrees<θ1≤180 degrees.

In particular, each of the cut trace 230 and the cut trace 232 can be corresponding to the injection inlet 280 of the imaging lens element 200 and a cut trace of the overflow area 290. The overflow area 290 can be provided to receive the welding line 295 or molding defects generated during the molding process of the molding article. Under the situation that the first surface 230$b$ of the cut trace 230 has the curvature radius r, it is favorable for adjusting the perfusion condition of the imaging lens element 200. Moreover, the molding defects receiving efficiency of the overflow area can be controlled by adjusting the angle θ1. Furthermore, under the situation that r and R are close to each other, the injection inlet 280 can be extended or the shape demand of the imaging lens element 200 can have more adjustment margin, so that a fuller and more ideal injection quality can be obtained.

More preferably, when the curvature radius of the first surface 230$b$ is r, and the curvature radius of the outer diameter surface 220 is R, the following condition can be satisfied: 0.72<r/R<1.20. Therefore, a proper ratio between the outer diameter surface 220 and the first surface 230$b$ can be maintained so as to prevent accidental injuries to the optical effective section 210 caused by cutting tools used in cutting operation. Moreover, it is favorable to prevent abrasion of cutting tools and damages to the imaging lens element 200 caused by the small value of the aforementioned ratio so that the manufacturing cost can be reduced.

As shown in FIG. 2E, the optical effective section 210 can include a second surface 214$a$ and a second surface 214$b$, wherein each of the second surface 214$a$ and the second surface 214$b$ can be from concave in a paraxial region thereof to convex in a peripheral region thereof. In particular, when each of the second surface 214$a$ and the second surface 214$b$ has the surface shape being from concave in the paraxial region thereof to convex in the peripheral region thereof, it essentially represents that a thickness of the optical effective section 210 changes from thin to thick, thus the appear position of the welding line can be controlled easily so as to increase the probability of welding line or other molding defects appearing in the overflow area.

As shown in FIG. 2D, each of the clearance surface 240 and the clearance surface 242 can be shrunk from the outer diameter reference plane 222 toward the center 202 of the imaging lens element 200. Therefore, it is favorable for identifying the cutting position of the overflow area after molding of the imaging lens element 200. Moreover, because the clearance surface 240 and the clearance surface 242 being shrunk are appeared near to the injection inlet 280, thus the cutting efficiency and the accuracy of the imaging lens element 200 can be improved.

Furthermore, in FIG. 2E, when a central thickness of the imaging lens element 200 is CT, and a diameter of the outer diameter surface 220 is φ, the following conditions can be satisfied: CT<1.8 mm; and φ<12 mm. Therefore, the excessive thickness or size of the imaging lens element 200 can be avoided, so that the molding defects will not be hidden within the imaging lens element 200 having excessive thickness and can be observed from the outward appearance thereof. Furthermore, it is favorable for obtaining a good quality of the imaging lens element 200 by setting the thickness of the imaging lens element 200 in a specific range but without processing a secondary molding process so as to reduce the manufacturing cost and the manufacturing time.

In the 1st embodiment, when the central thickness of the imaging lens element 200 is CT, the following condition can be satisfied: 0.25 mm<CT<0.95 mm. Therefore, a proper thickness range of the imaging lens element 200 can be obtained and the molding condition of the imaging lens element 200 can be controlled easily in a single-molded process so as to optimize the production process. More preferably, the following condition can be satisfied: 0.25 mm<CT<0.70 mm. Even more preferably, the following condition can be satisfied: CT<0.50 mm. Therefore, the imaging lens element 200 is favorably applied to a camera module with high pixels and compact size. Furthermore, thinner imaging lens element 200 can be favorable for tracking the problem of the molding defects by the relevant personnel.

In the 1st embodiment, when the central thickness of the imaging lens element 200 is CT, and the curvature radius of the outer diameter surface 220 is R, the following condition can be satisfied: 6.0<R/CT<15.0. More preferably, the following condition can be satisfied: 7.5<R/CT<15.0. Therefore, it is favorable for molding the imaging lens element 200 with long and narrow outward appearance so as to prevent over accumulation of the molding article, and it is favorable for controlling the flow trace of the welding line.

As shown in FIG. 2E, the optical effective section 210 can further include an object-side optical effective section 216a and an image-side optical effective section 216b. When a diameter of the object-side optical effective section 216a is φi1, a diameter of the image-side optical effective section 216b is φi2, and the diameter of the outer diameter surface 220 is φ, the following conditions can be satisfied: 0.70<φi1/φ<1.0; and 0.70<φi2/φ<1.0. Therefore, the optical effective section 210 can be closer to the outer diameter surface 220 so as to reduce unnecessary volume of the imaging lens element 200. Under the situation, the molding defects can form in the overflow area easily so as to improve the molding quality of the optical effective section 210. More preferably, the following conditions can be satisfied: 0.74<φi1/φ<1.0; and 0.82<φi2/φ<1.0. Therefore, the optical effective section 210 can be closer to the outer diameter surface 220 so as to reduce the stray light in the reflection path within the imaging lens element 200, so that it is favorable for controlling the effect of the stray light.

Furthermore, as shown in FIG. 2E, when the angle between the first connecting line L1 and the second connecting line L2 is θ1, a maximum thickness of the imaging lens element 200 in a peripheral region thereof is ETmax, and a vertical distance between a position 218 of the maximum thickness and the optical axis 212 is (φETmax/2), the following conditions are satisfied: 0.20φ<φETmax<0.80φ; 1.0<ETmax/CT<4.5; and 90 degrees<180 degrees (φETmax is defined as a specific parameter but not a multiplying value of φ and ETmax). Under the situation that the optical effective section 210 has partial thickness variation, the flow pattern of the molding article can be predicted easily and the molding defects are easier to appear in a controlled range. Therefore, the flow of the molding article in the optical effective section 210 can be maintained steady. Furthermore, with a proper setting value of θ1, flowing position which is unstable of the molding article can be controlled near to the overflow area, so that the molding defects can be removed with the cutting operation after molding.

Furthermore, the position 218 of the maximum thickness of the imaging lens element 200 in the peripheral region thereof can be located in the optical effective section 210. Therefore, the molding quality of the optical effective section 210 can be the best within the imaging lens element 200.

Furthermore, when the diameter of the object-side optical effective section 216a is φi1, the diameter of the image-side optical effective section 216b is φi2, and the vertical distance between a position 218 of the maximum thickness and the optical axis 212 is (φETmax/2), the following conditions are satisfied: φETmax<φi1; and φETmax<φi2. Therefore, the flow of the molding article in the optical effective section 210 can be more stable so as to maintain the light converging quality of the imaging lens element 200.

Figure 2F:
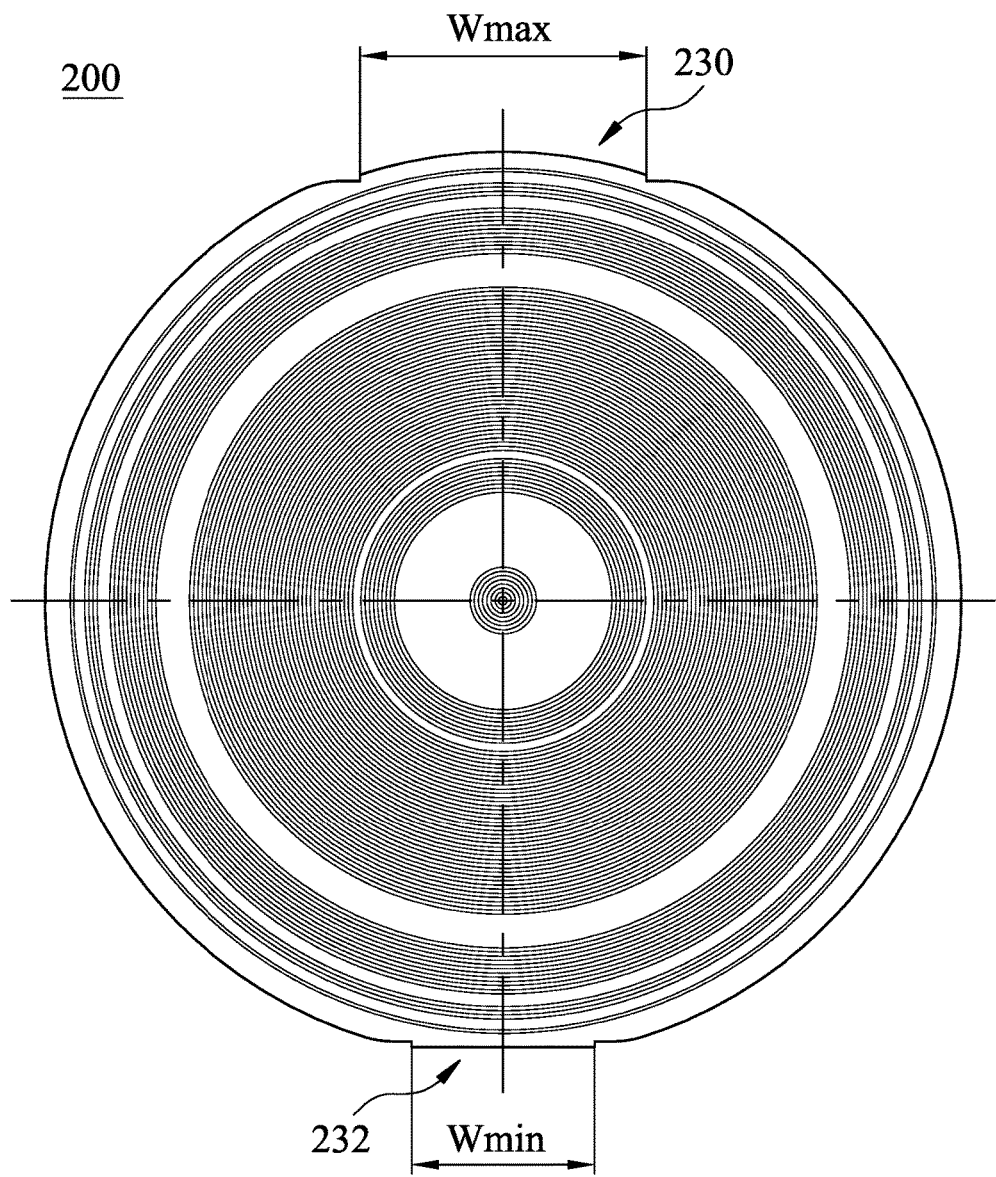
FIG. 2F is a front view of the imaging lens element according to the 1st embodiment of the present disclosure.
Figure 2G:
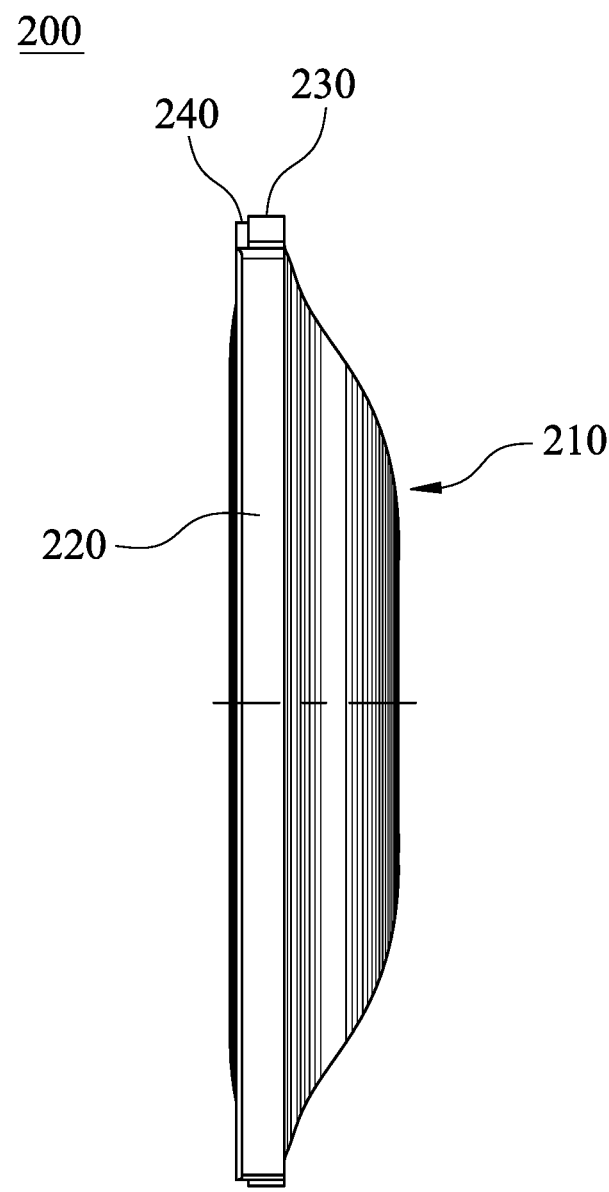
FIG. 2G is a side view of the imaging lens element according to the 1st embodiment of the present disclosure.

FIG. 2F is a front view of the imaging lens element 200 according to the 1st embodiment of the present disclosure. FIG. 2G is a side view of the imaging lens element 200 according to the 1st embodiment of the present disclosure. As shown in FIG. 2F and FIG. 2G, when a maximum of widths of the cut trace 230 and the cut trace 232 is Wmax, and a minimum of widths of the cut trace 230 and cut trace 232 is Wmin, the following condition can be satisfied: 1.25<Wmax/Wmin<3.5. Therefore, the efficiency differences of the injection and flashing can be controlled corresponding to the demands, so that the molding efficiency of the optical effective section 210 can be maintained steady so as to improve the efficiency of mass production and stability of the quality.

Figure 2H:
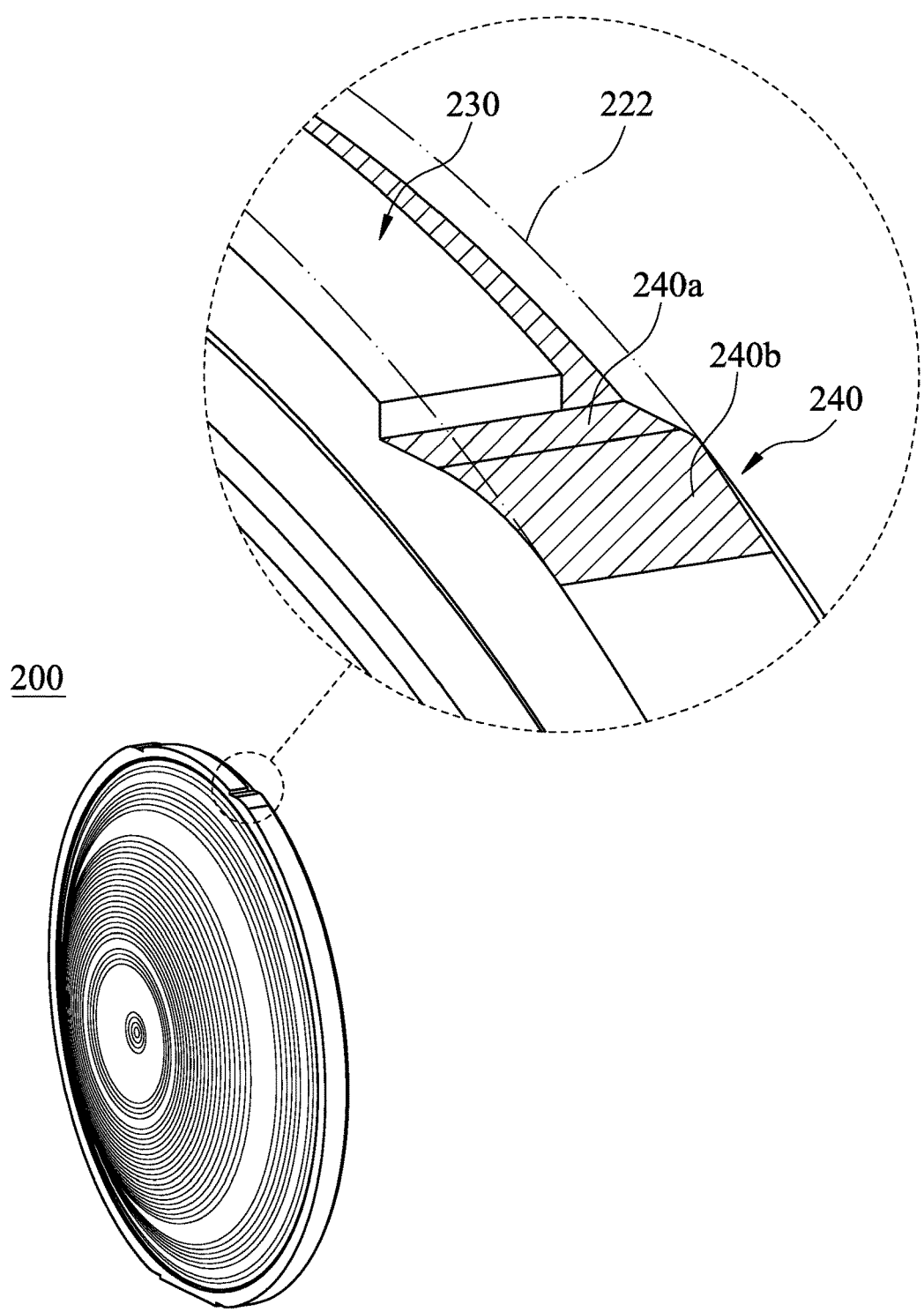
FIG. 2H is a three-dimensional schematic view of the imaging lens element according to the 1st embodiment of the present disclosure.
Figure 2I:
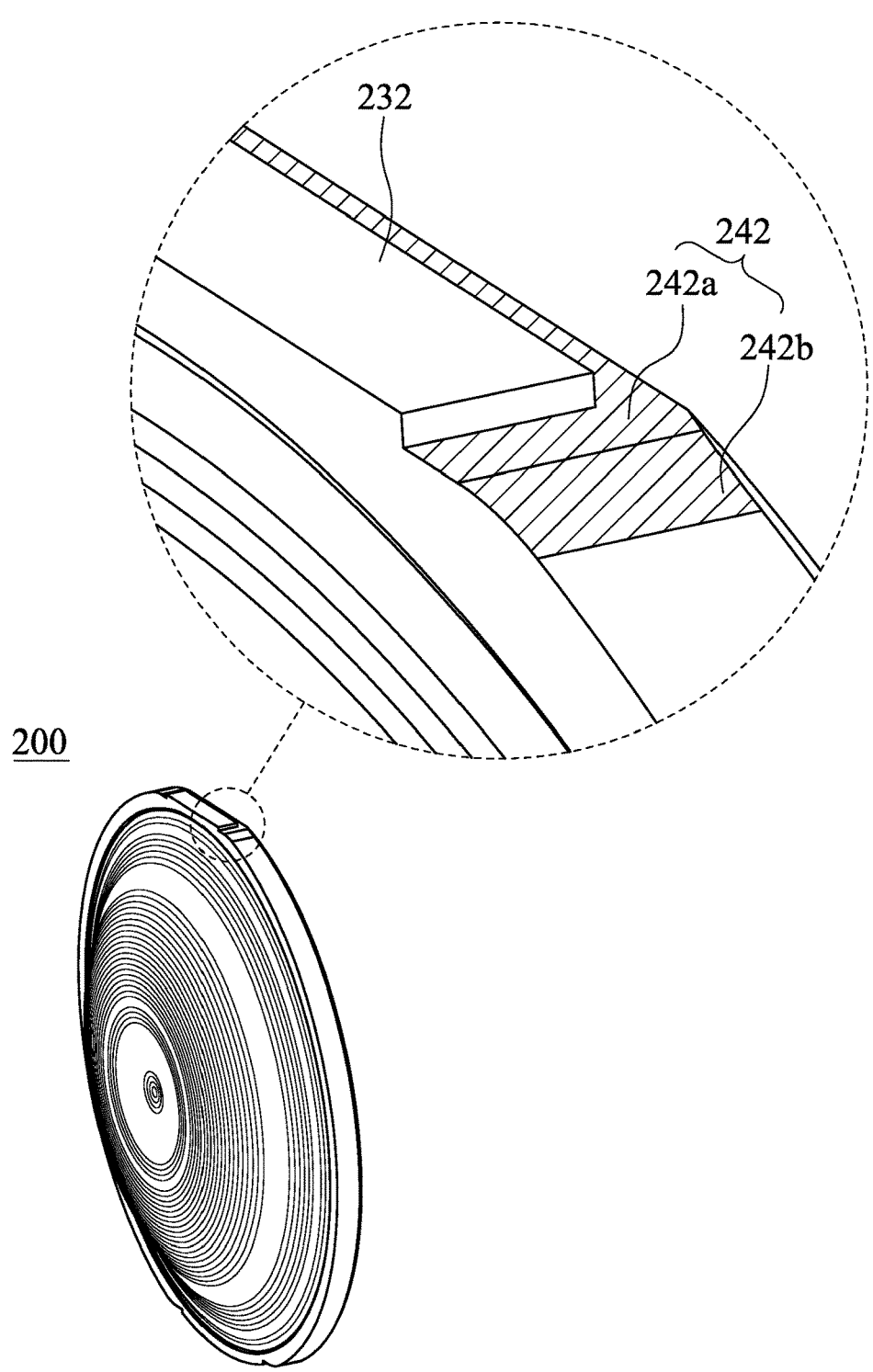
FIG. 2I is another three-dimensional schematic view of the imaging lens element according to the 1st embodiment of the present disclosure.

FIG. 2H is a three-dimensional schematic view of the imaging lens element 200 according to the 1st embodiment of the present disclosure. FIG. 2I is another three-dimensional schematic view of the imaging lens element 200 according to the 1st embodiment of the present disclosure. As shown in FIG. 2H, the clearance surface 240 (that is, as the slash area shown in FIG. 2H) can include a plane 240a and a third surface 240b having a curvature radius. As shown in FIG. 2I, the clearance surface 242 (that is, as the slash area shown in FIG. 2I) can include a plane 242a and a third surface 242b having a curvature radius. Therefore, the curvature radii of the clearance surface 240 and the clearance surface 242 can be designed properly corresponding to the appearance of the imaging lens element 200, so that it is favorable for molding the imaging lens element 200 having a larger optical effective section 210, which is suitable for applying in the imaging lens element 200 including the outer diameter surface 220 which is very close to the optical effective section 210.

The detailed data of the aforementioned parameters of the imaging lens element 200 in the 1st embodiment of the present disclosure are shown in Table 1 below, and as shown in FIG. 2D, FIG. 2E and FIG. 2F.

TABLE 1

| 1st embodiment | |
| --- | --- |
| r | 3.925 mm |
| R | 4 mm |
| Φ | 8 mm |
| ΦETmax | 4.118 mm |
| ETmax | 1.165 mm |
| θ1 | 180 degrees |
| CT | 0.467 mm |
| Wmax | 2.5 mm |
| Wmin | 1.6 mm |
| Φi1 | 6.8 mm |
| Φi2 | 7.5 mm |
| ETmax/CT | 2.495 |

2nd Embodiment

Figure 3A:
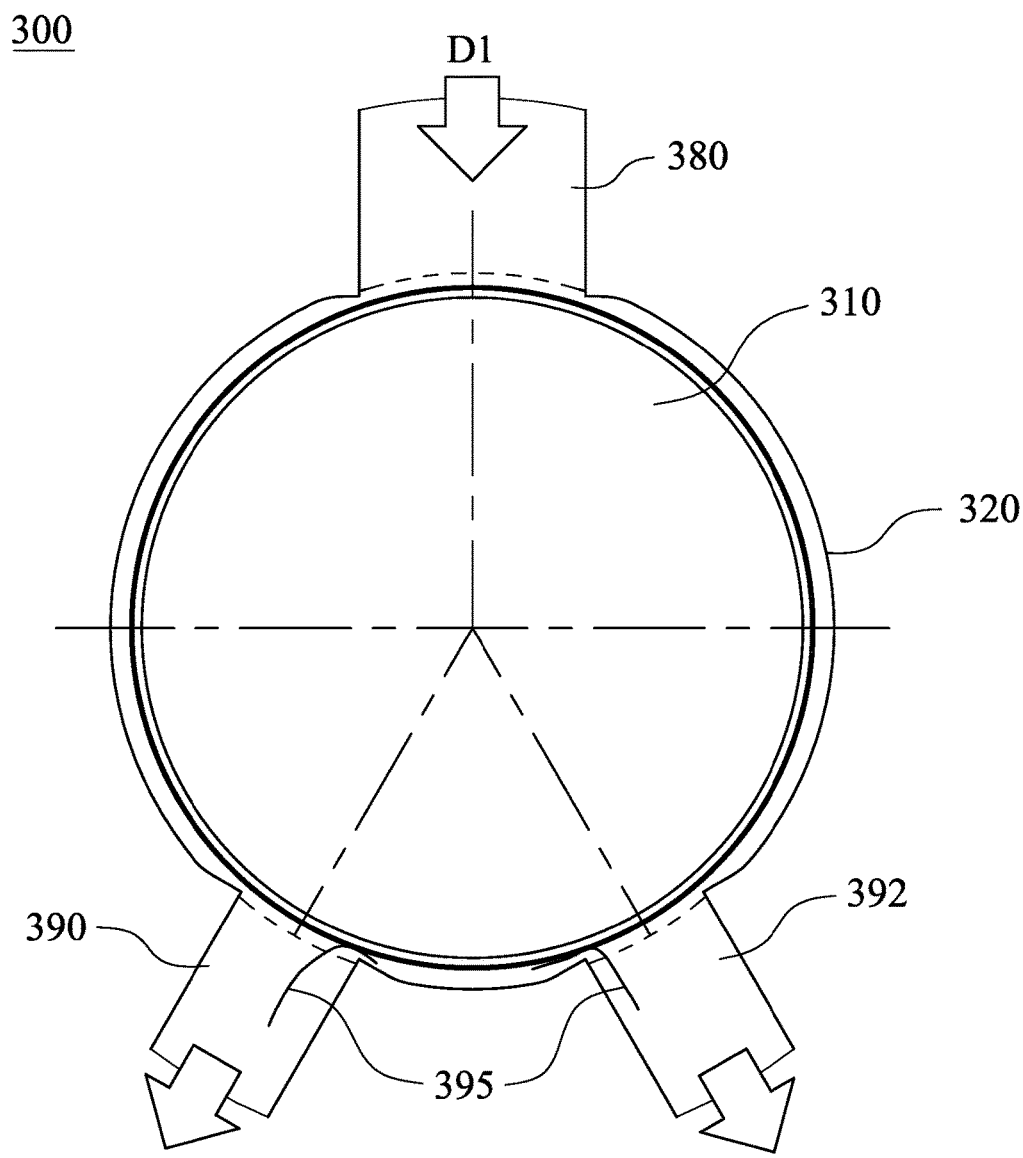
FIG. 3A is a perfusion schematic view of a molding article of an imaging lens element according to the 2nd embodiment of the present disclosure.

FIG. 3A is a perfusion schematic view of a molding article of an imaging lens element 300 according to the 2nd embodiment of the present disclosure. As shown in FIG. 3A, the molding article can be perfused from an injection inlet 380 into the imaging lens element 300 along a direction D1. Since the redundant molding article can flow out to an overflow area 390 and an overflow area 392, the molding defects, such as a welding line 395 etc., will not appear within an optical effective section 310. Furthermore, the imaging lens element 300 can be made by a single-molded process, and the imaging lens element 300 can include only one injection inlet 380.

Figure 3B:
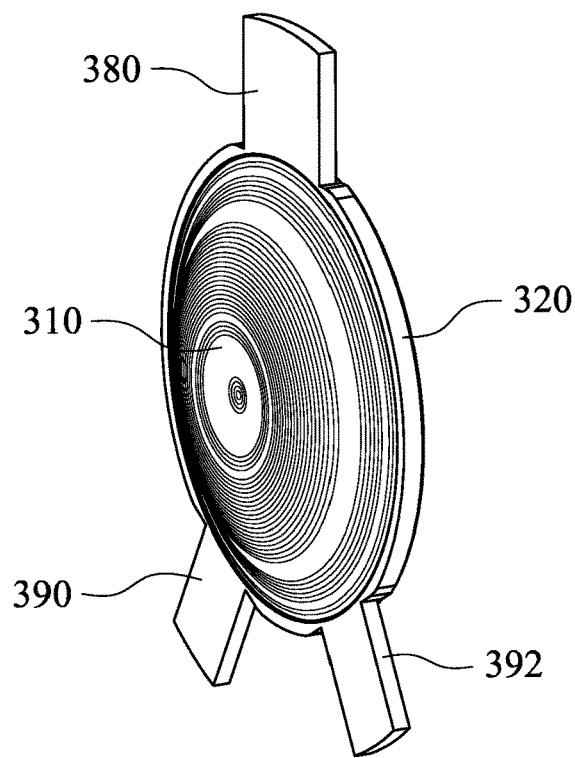
FIG. 3B is a schematic view of the imaging lens element of the 2nd embodiment after molding but not removing an injection inlet and an overflow area.
Figure 3C:
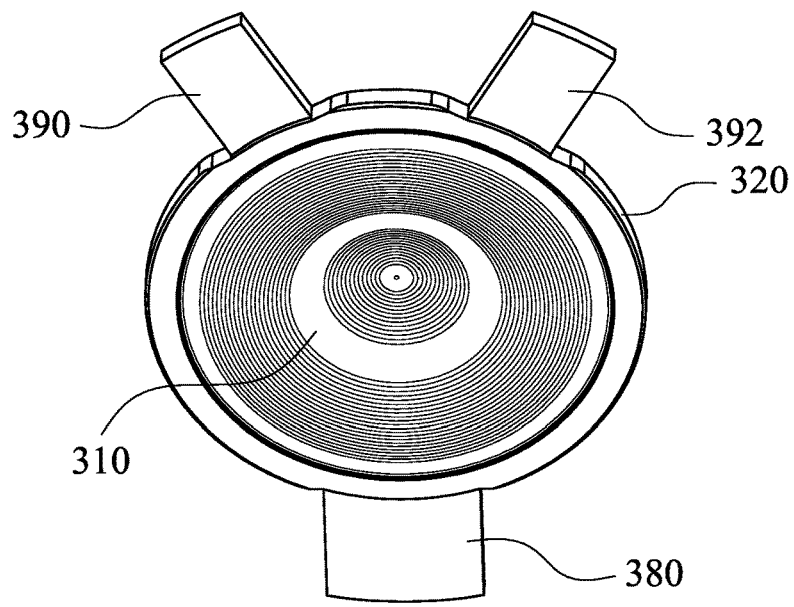
FIG. 3C is another schematic view of the imaging lens element of the 2nd embodiment after molding but not removing the injection inlet and the overflow area.

FIG. 3B is a schematic view of the imaging lens element 300 of the 2nd embodiment after molding but not removing the injection inlet 380, the overflow area 390 and the overflow area 392. FIG. 3C is another schematic view of the imaging lens element 300 of the 2nd embodiment after molding but not removing the injection inlet 380, the overflow area 390 and the overflow area 392. In FIG. 3B and FIG. 3C, the injection inlet 380, the overflow area 390 and the overflow area 392 can be cut off so as to leave corresponding cut traces on an outer diameter surface 320. The details are shown below.

Figure 3D:
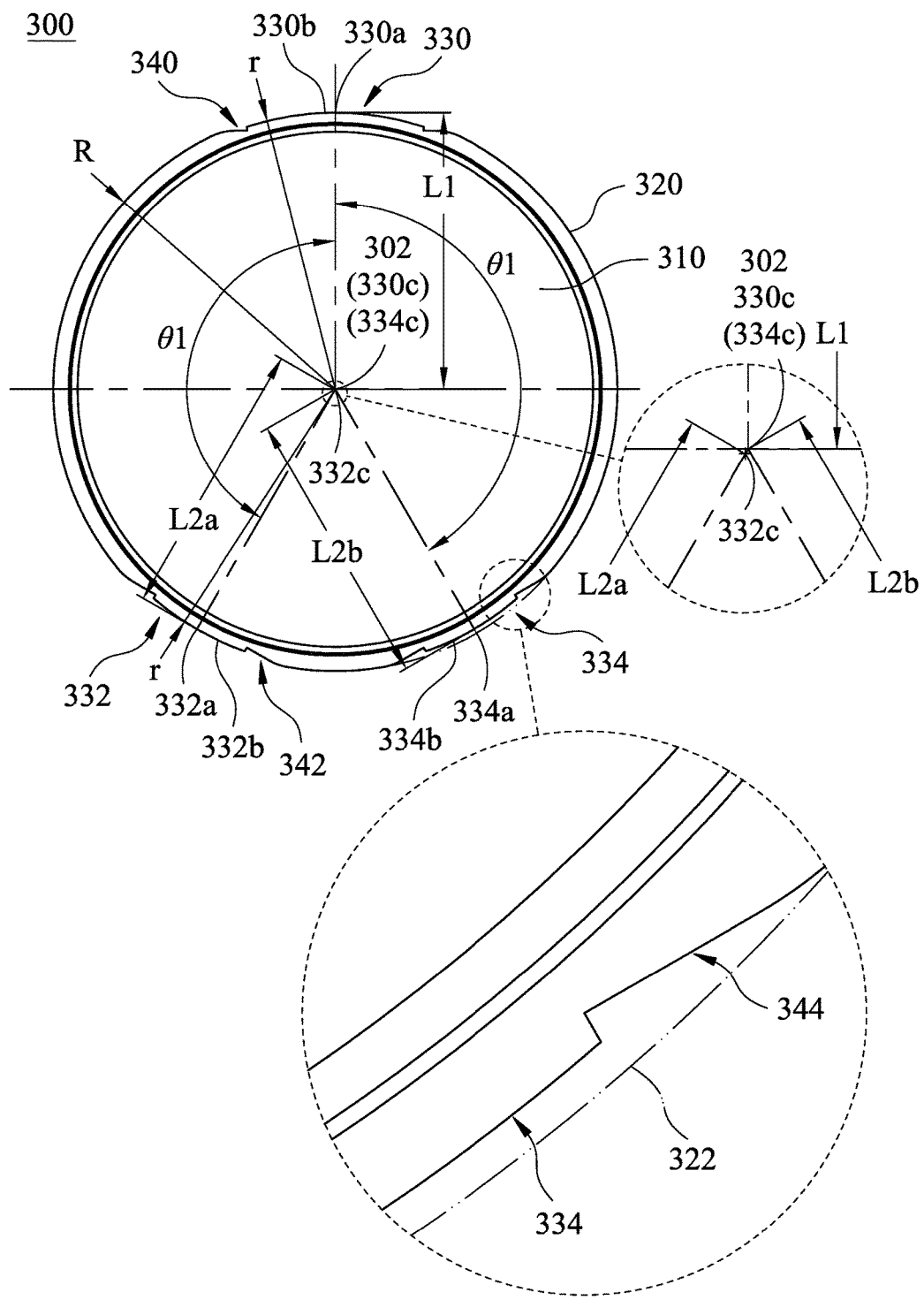
FIG. 3D is a schematic view of the imaging lens element according to the 2nd embodiment of the present disclosure.
Figure 3E:
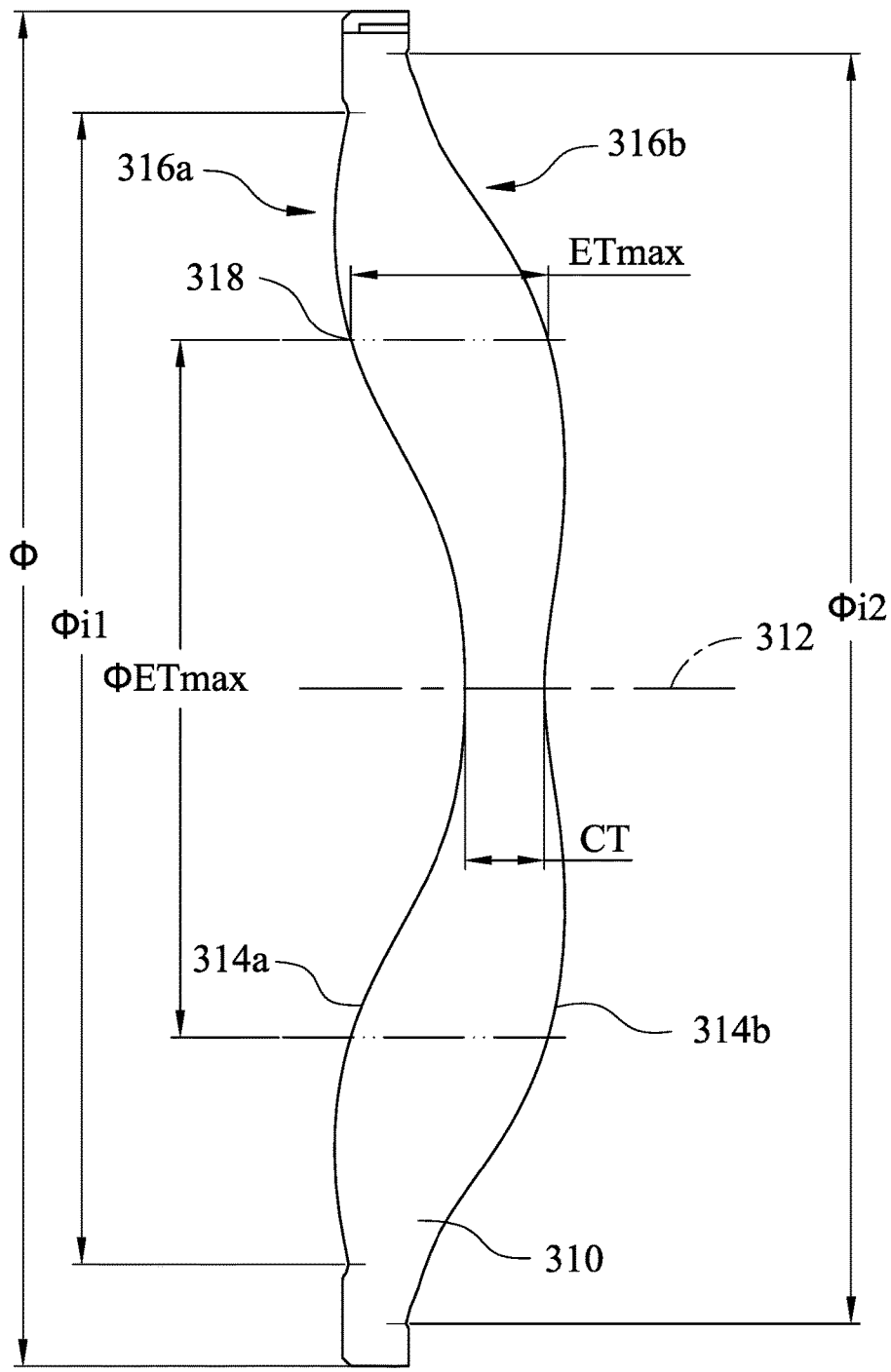
FIG. 3E is a cross-sectional view of the imaging lens element according to the 2nd embodiment of the present disclosure.

FIG. 3D is a schematic view of the imaging lens element 300 according to the 2nd embodiment of the present disclosure. FIG. 3E is a cross-sectional view of the imaging lens element 300 according to the 2nd embodiment of the present disclosure. As shown in FIG. 3D and FIG. 3E, the imaging lens element 300 of the 2nd embodiment includes an optical effective section 310, an outer diameter surface 320, a cut trace 330, a cut trace 332, a cut trace 334, a clearance surface 340, a clearance surface 342 and a clearance surface 344. The optical effective section 310 has an optical axis 312. The outer diameter surface 320 surrounds the optical effective section 310. Each of the cut trace 330, the cut trace 332 and the cut trace 334 is shrunk from an outer diameter reference plane 322 of the outer diameter surface 320 toward a center 302 of the imaging lens element 300 (which is corresponding to the optical axis 312). The clearance surface 340 is connected between the cut trace 330 and the outer diameter surface 320, the clearance surface 342 is connected between the cut trace 332 and the outer diameter surface 320, and the clearance surface 344 is connected between the cut trace 334 and the outer diameter surface 320.

The cut trace 330 includes a first surface 330b, wherein a curvature center 330c of the first surface 330b is closer to the center 302 of the imaging lens element 300 than the first surface 330b thereto. The cut trace 332 includes a first surface 332b, wherein a curvature center 332c of the first surface 332b is closer to the center 302 of the imaging lens element 300 than the first surface 332b thereto. The cut trace 334 includes a first surface 334b, wherein a curvature center 334c of the first surface 334b is closer to the center 302 of the imaging lens element 300 than the first surface 334b thereto.

The cut trace 330 has a surface center 330a, the cut trace 332 has a surface center 332a, and the cut trace 334 has a surface center 334a. A first connecting line L1 is defined between the surface center 330a of the cut trace 330 and the optical axis 312, a second connecting line L2a is defined between the surface center 332a of the cut trace 332 and the optical axis 312, a second connecting line L2b is defined between the surface center 334a of the cut trace 334 and the optical axis 312, and each of the first connecting line L1, the second connecting line L2a and the second connecting line L2b is perpendicular to the optical axis 312. When an angle between the first connecting line L1 and the second connecting line L2a is θ1, an angle between the first connecting line L1 and the second connecting line L2b is θ1, a curvature radius of the first surface 330b is r, a curvature radius of the first surface 332b is r, and a curvature radius of the outer diameter surface 320 is R, the following conditions are satisfied: $0.60<r/R<1.35$; and 90 degrees$<θ1≤180$ degrees.

In particular, each of the cut trace 330, the cut trace 332 and the cut trace 334 can be corresponding to the injection inlet 380 as well as the overflow area 390 of the imaging lens element 300 and a cut trace of the overflow area 392. The overflow area 390 and the overflow area 392 can be provided to receive the welding line 395 or molding defects generated during the molding process of the molding article.

More preferably, when the curvature radius of the first surface 330b is r, the curvature radius of the first surface 332b is r, and the curvature radius of the outer diameter surface 320 is R, the following condition can be satisfied: $0.72<r/R<1.20$.

As shown in FIG. 3E, the optical effective section 310 can include a second surface 314a and a second surface 314b, wherein each of the second surface 314a and the second surface 314b can be from concave in a paraxial region thereof to convex in a peripheral region thereof.

As shown in FIG. 3D, each of the clearance surface 340, the clearance surface 342 and the clearance surface 344 can be shrunk from the outer diameter reference plane 322 toward the center 302 of the imaging lens element 300. Furthermore, a number of the cut trace 330, the cut trace 332 and the cut trace 334 can be three, the cut trace 330, the cut trace 332 and the cut trace 334 can be asymmetrically disposed on the outer diameter surface 320, and distances between each two of the cut trace 330, the cut trace 332 and the cut trace 334 can be not all equal to each other. Therefore, the welding line 395 can appear away from the optical effective section 310 easily and can be accumulated near to the overflow area 390 and the overflow area 392. Moreover, a greater degree of freedom for adjusting the overflow area 390 and the overflow area 392 can be obtained by the aforementioned asymmetrical arrangement.

Furthermore, in the FIG. 3E, when a central thickness of the imaging lens element 300 is CT, and a diameter of the outer diameter surface 320 is ϕ, the following conditions can be satisfied: $CT<1.8$ mm; and $ϕ<12$ mm.

In the 2nd embodiment, when the central thickness of the imaging lens element 300 is CT, the following condition can be satisfied: $0.25$ mm$<CT<0.95$ mm. More preferably, the following condition can be satisfied: $0.25$ mm$<CT<0.70$ mm. Further preferably, the following condition can be satisfied: $CT<0.50$ mm.

In the 2nd embodiment, when the central thickness of the imaging lens element 300 is CT, and the curvature radius of the outer diameter surface 320 is R, the following condition can be satisfied: $6.0<R/CT<15.0$. More preferably, the following condition can be satisfied: $7.5<R/CT<15.0$.

As shown in FIG. 3E, the optical effective section 310 can further include an object-side optical effective section 316a and an image-side optical effective section 316b. When a diameter of the object-side optical effective section 316a is ϕi1, a diameter of the image-side optical effective section 316b is ϕi2, and the diameter of the outer diameter surface 320 is ϕ, the following conditions can be satisfied: $0.70<ϕi1/ϕ<1.0$; and $0.70<ϕi2/ϕ<1.0$. More preferably, the following conditions can be satisfied: $0.74<ϕi1/ϕ<1.0$; and $0.82<ϕi2/ϕ<1.0$.

Furthermore, as shown in FIG. 3E, when the angle between the first connecting line L1 and the second connecting line L2a is θ1, the angle between the first connecting line L1 and the second connecting line L2b is θ1, a maximum thickness of the imaging lens element 300 in a peripheral region thereof is ETmax, and a vertical distance between a position 318 of the maximum thickness and the optical axis 312 is (ϕETmax/2), the following conditions are satisfied: $0.20ϕ<ϕETmax<0.80ϕ$; $1.0<ETmax/CT<4.5$; and 90 degrees$<θ1≤180$ degrees (ϕETmax is defined as a specific parameter but not a multiplying value of ϕ and ETmax).

Furthermore, the position 318 of the maximum thickness of the imaging lens element 300 in the peripheral region thereof can be located in the optical effective section 310. Moreover, when the diameter of the object-side optical effective section 316a is ϕi1, the diameter of the image-side optical effective section 316b is ϕi2, and the vertical distance between the position 318 of the maximum thickness and the optical axis 312 is (ϕETmax/2), the following conditions are satisfied: ϕETmax<ϕi1; and ϕETmax<ϕi2.

Figure 3F:
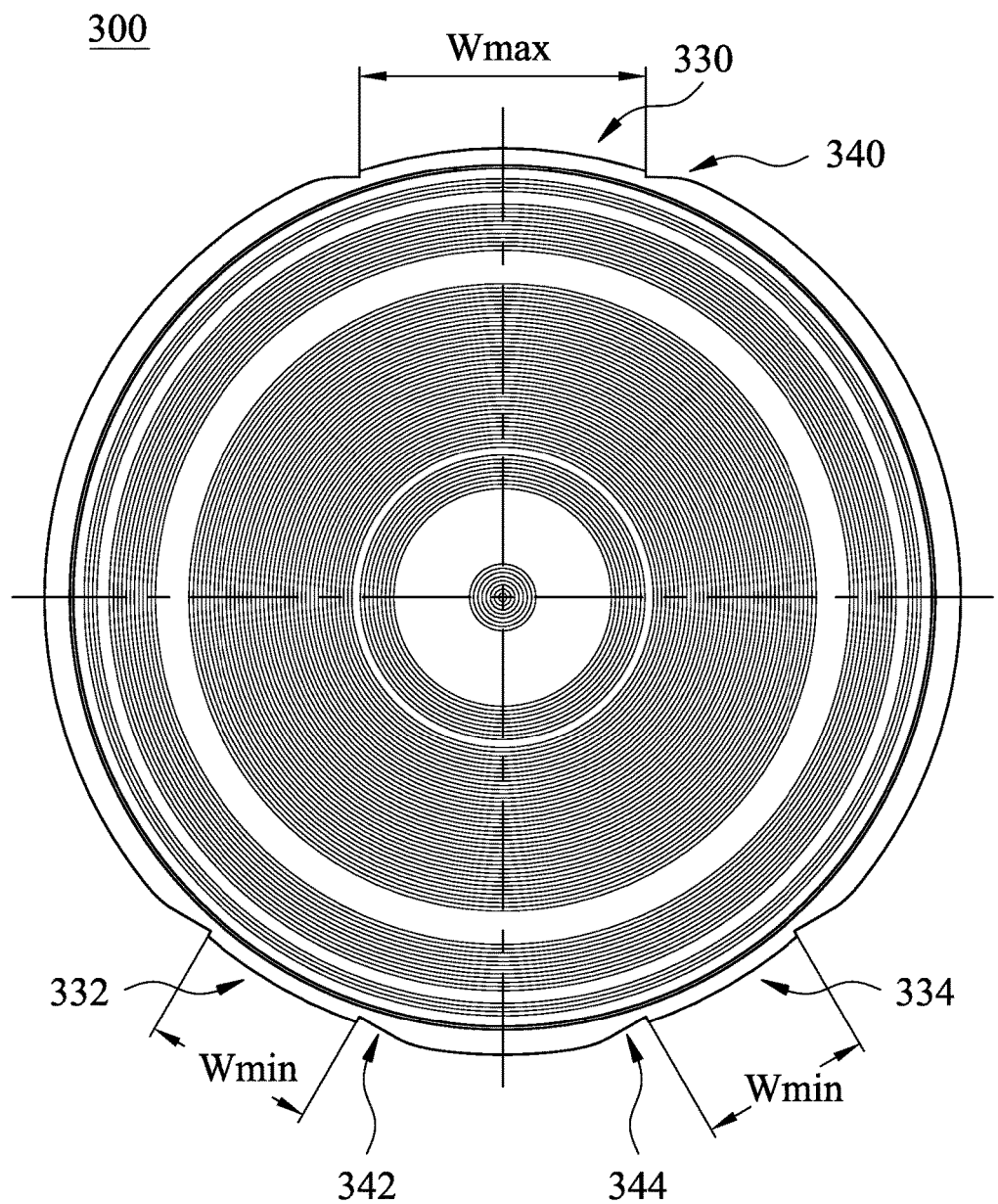
FIG. 3F is a front view of the imaging lens element according to the 2nd embodiment of the present disclosure.
Figure 3G:
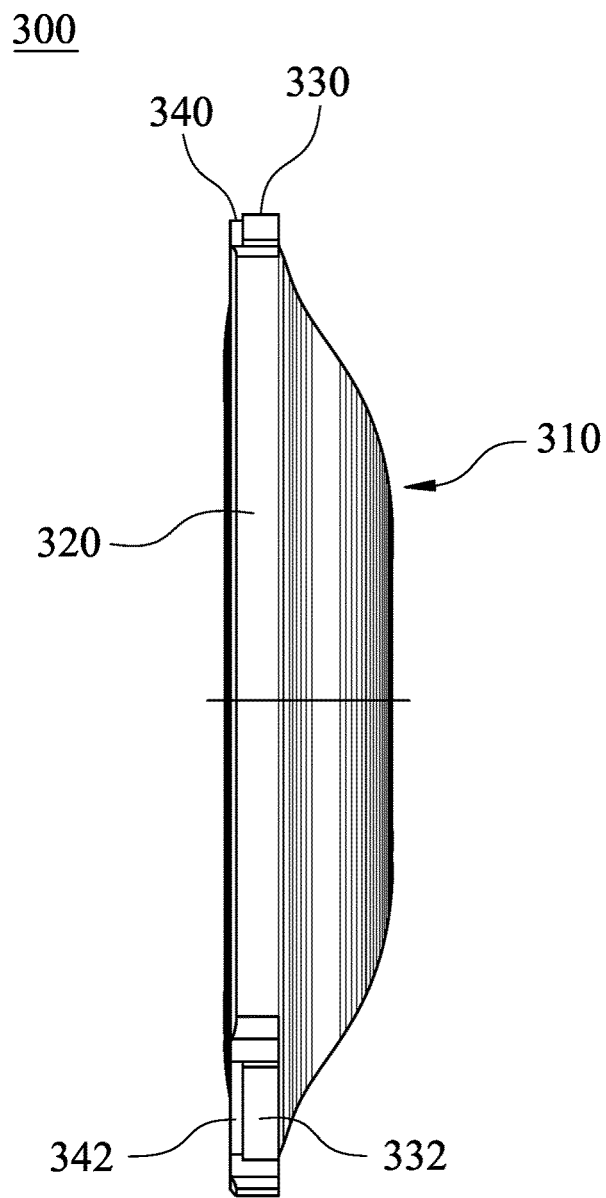
FIG. 3G is a side view of the imaging lens element according to the 2nd embodiment of the present disclosure.

FIG. 3F is a front view of the imaging lens element 300 according to the 2nd embodiment of the present disclosure. FIG. 3G is a side view of the imaging lens element 300 according to the 2nd embodiment of the present disclosure. As shown in FIG. 3F and FIG. 3G, when a maximum of widths of the cut trace 330, the cut trace 332 and the cut trace 334 is Wmax, and a minimum of widths of the cut trace 330, the cut trace 332 and the cut trace 334 is Wmin, the following condition can be satisfied: 1.25<Wmax/Wmin<3.5.

Figure 3H:
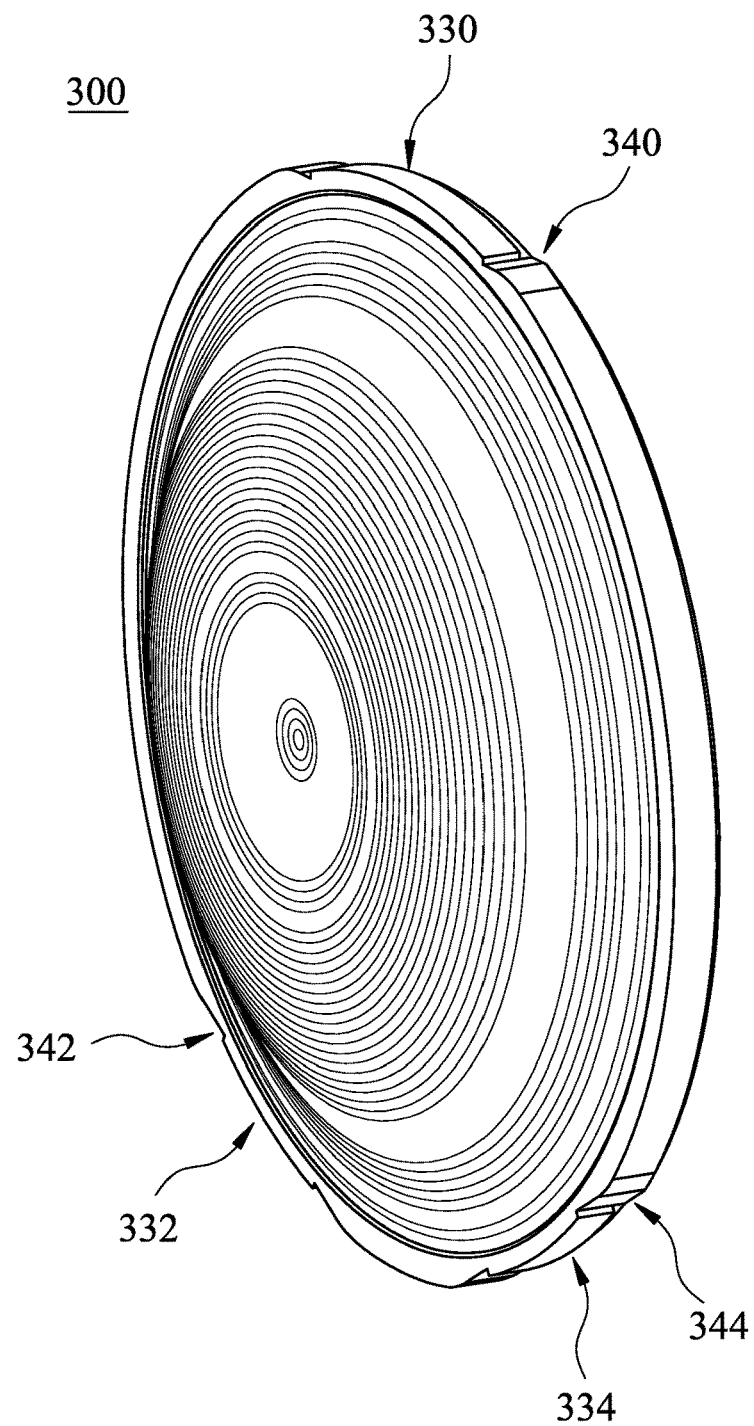
FIG. 3H is a three-dimensional schematic view of the imaging lens element according to the 2nd embodiment of the present disclosure.
Figure 3I:
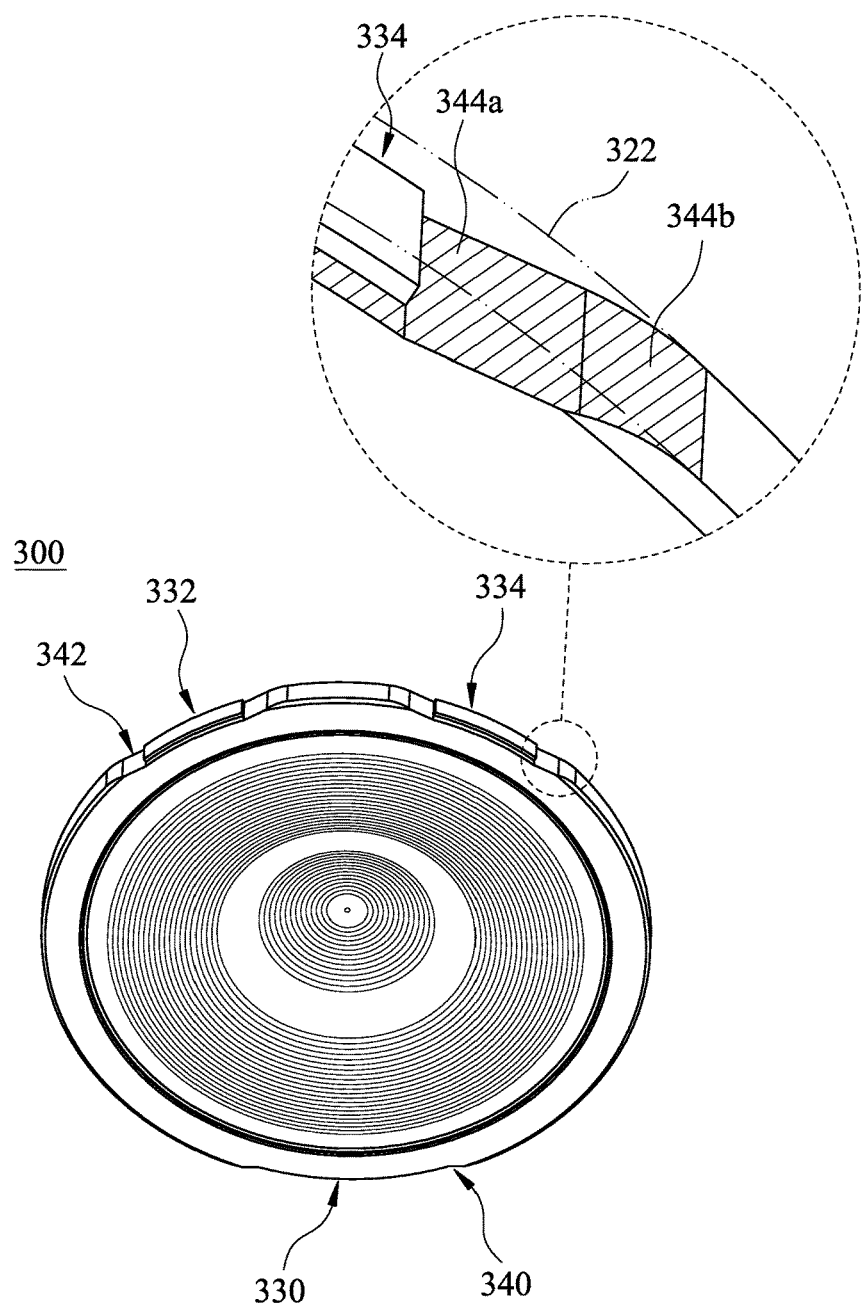
FIG. 3I is another three-dimensional schematic view of the imaging lens element according to the 2nd embodiment of the present disclosure.

FIG. 3H is a three-dimensional schematic view of the imaging lens element 300 according to the 2nd embodiment of the present disclosure. FIG. 3I is another three-dimensional schematic view of the imaging lens element 300 according to the 2nd embodiment of the present disclosure. As shown in FIG. 3I, the clearance surface 344 (that is, as the slash area shown in FIG. 3I) can include a plane 344a and a third surface 344b having a curvature radius.

The detailed data of the aforementioned parameters of the imaging lens element 300 in the 2nd embodiment of the present disclosure are shown in Table 2 below, and as shown in FIG. 3D, FIG. 3E and FIG. 3F.

TABLE 2

2nd embodiment

| | | |
|---|---|---|
| r | 3.925 | mm |
| R | 4 | mm |
| Φ | 8 | mm |
| ΦETmax | 4.118 | mm |
| ETmax | 1.165 | mm |
| θ1 | 150 | degrees |
| CT | 0.467 | mm |
| Wmax | 2.5 | mm |
| Wmin | 1.5 | mm |
| Φi1 | 6.8 | mm |
| Φi2 | 7.5 | mm |
| ETmax/CT | 2.495 | |

3rd Embodiment

Figure 4A:
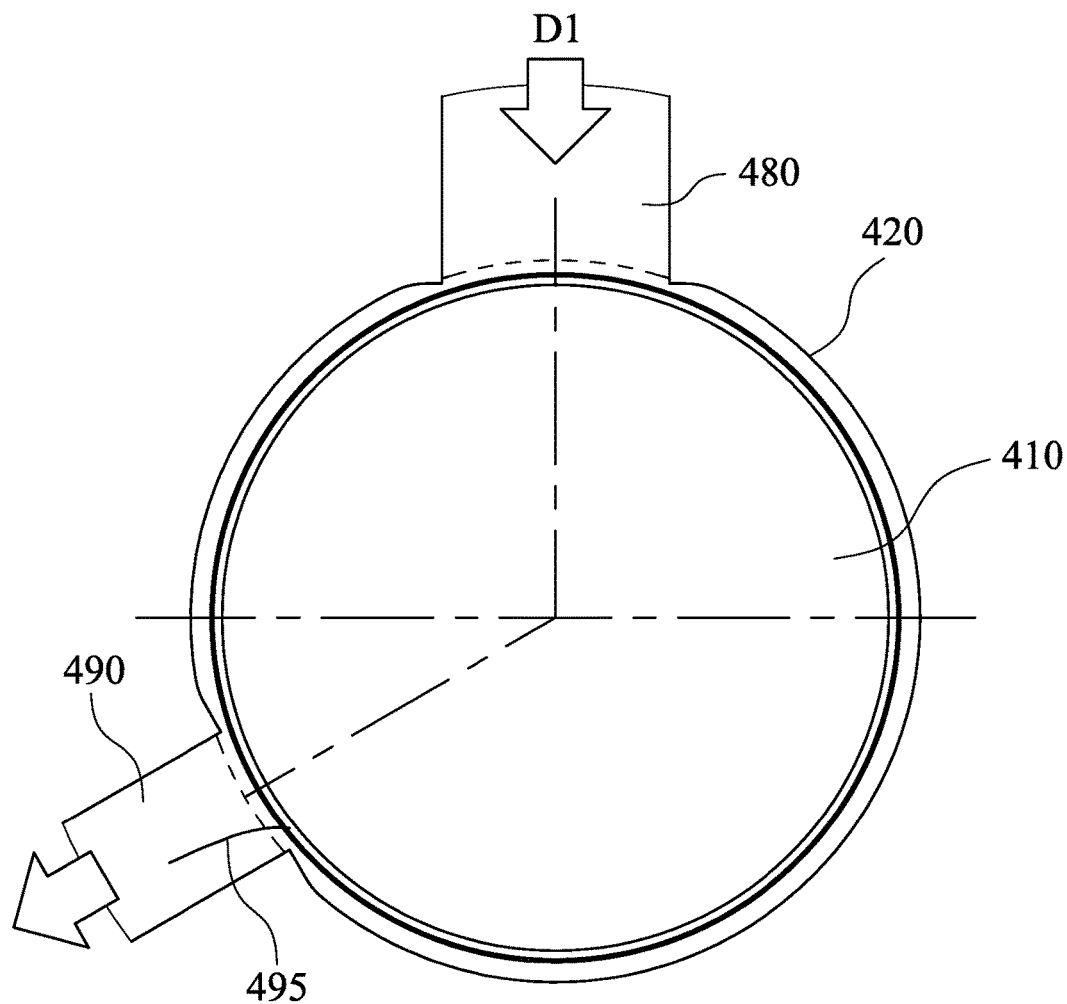
FIG. 4A is a perfusion schematic view of a molding article of an imaging lens element according to the 3rd embodiment of the present disclosure.

FIG. 4A is a perfusion schematic view of a molding article of an imaging lens element 400 according to the 3rd embodiment of the present disclosure. As shown in FIG. 4A, the molding article can be perfused from an injection inlet 480 into the imaging lens element 400 along a direction D1. Since the redundant molding article can flow out to an overflow area 490, the molding defects, such as a welding line 495 etc., will not appear within an optical effective section 410. Furthermore, the imaging lens element 400 can be made by a single-molded process, and the imaging lens element 400 can include only one injection inlet 480.

Figure 4B:
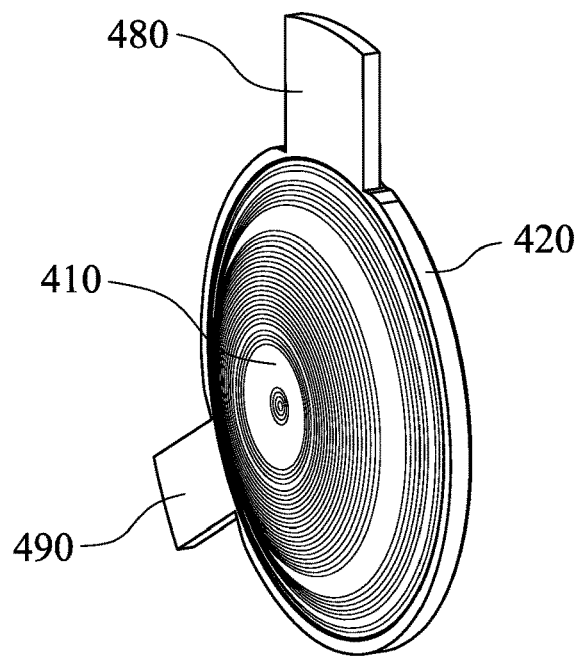
FIG. 4B is a schematic view of the imaging lens element of the 3rd embodiment after molding but not removing an injection inlet and an overflow area.
Figure 4C:
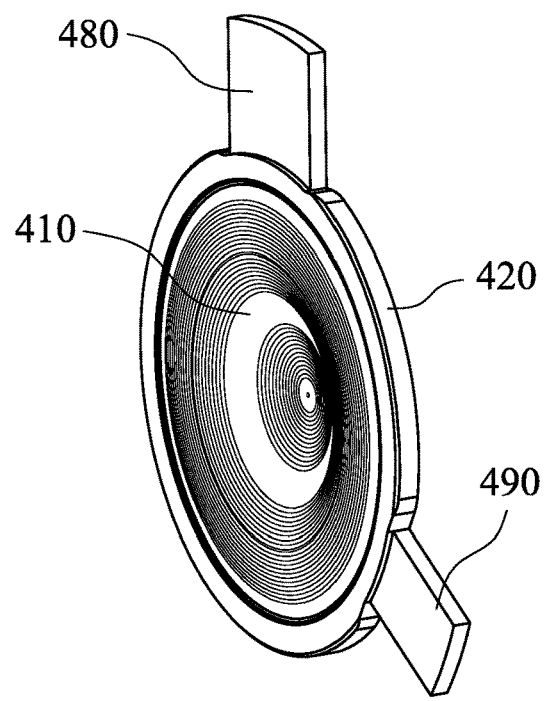
FIG. 4C is another schematic view of the imaging lens element of the 3rd embodiment after molding but not removing the injection inlet and the overflow area.

FIG. 4B is a schematic view of the imaging lens element 400 of the 3rd embodiment after molding but not removing the injection inlet 480 and the overflow area 490. FIG. 4C is another schematic view of the imaging lens element 400 of the 3rd embodiment after molding but not removing the injection inlet 480 and the overflow area 490. In FIG. 4B and FIG. 4C, the injection inlet 480 and the overflow area 490 can be cut off so as to leave corresponding cut traces on an outer diameter surface 420. The details are shown below.

Figure 4D:
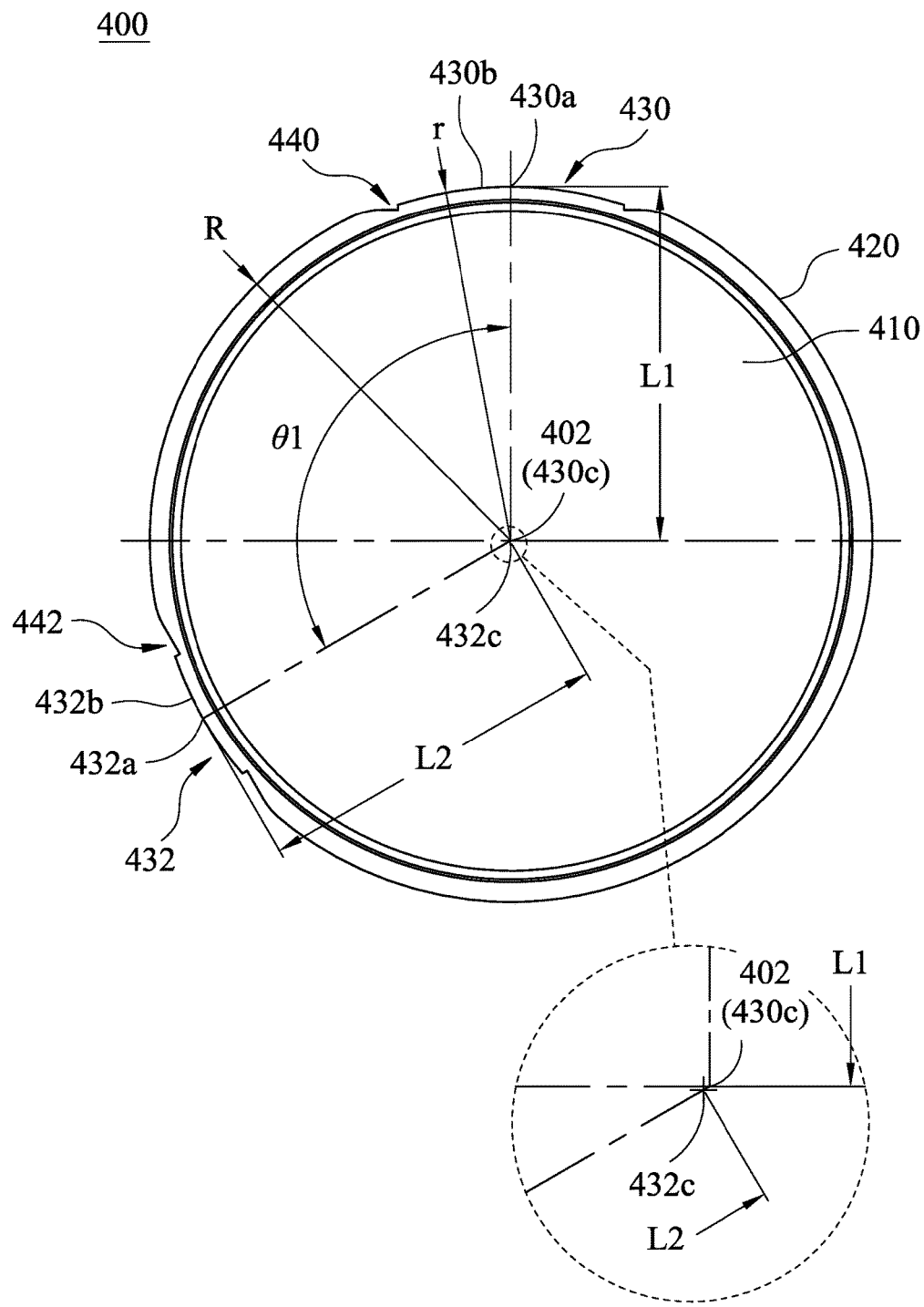
FIG. 4D is a schematic view of the imaging lens element according to the 3rd embodiment of the present disclosure.
Figure 4E:
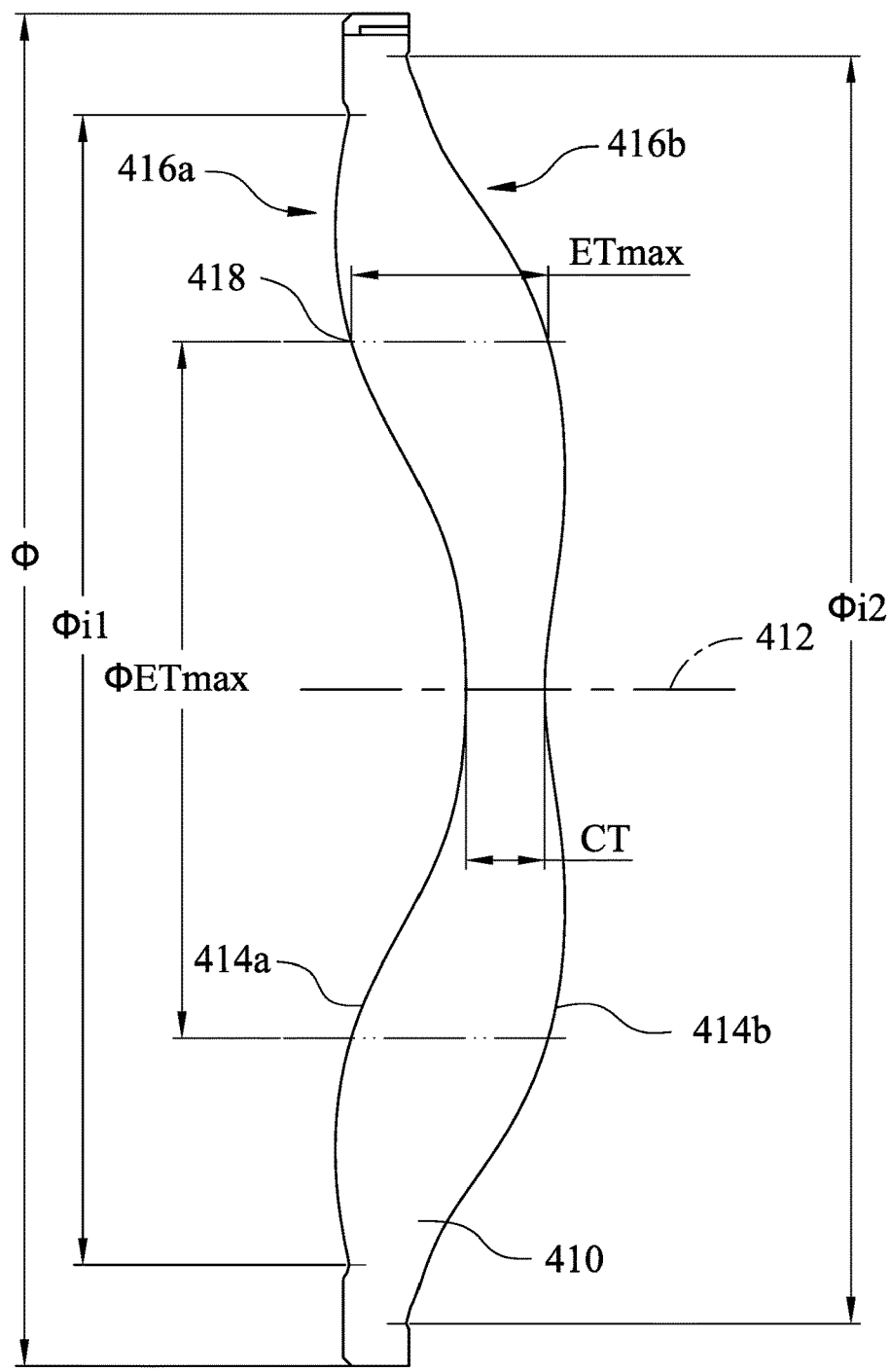
FIG. 4E is a cross-sectional view of the imaging lens element according to the 3rd embodiment of the present disclosure.

FIG. 4D is a schematic view of the imaging lens element 400 according to the 3rd embodiment of the present disclosure. FIG. 4E is a cross-sectional view of the imaging lens element 400 according to the 3rd embodiment of the present disclosure. As shown in FIG. 4D and FIG. 4E, the imaging lens element 400 of the 3rd embodiment includes an optical effective section 410, an outer diameter surface 420, a cut trace 430, a cut trace 432, a clearance surface 440 and a clearance surface 442. The optical effective section 410 has an optical axis 412. The outer diameter surface 420 surrounds the optical effective section 410. Each of the cut trace 430 and the cut trace 432 is shrunk from an outer diameter reference plane (reference number is not shown) of the outer diameter surface 420 toward a center 402 (which is corresponding to the optical axis 412) of the imaging lens element 400. The clearance surface 440 is connected between the cut trace 430 and the outer diameter surface 420, and the clearance surface 442 is connected between the cut trace 432 and the outer diameter surface 420.

The cut trace 430 includes a first surface 430b, wherein a curvature center 430c of the first surface 430b is closer to the center 402 of the imaging lens element 400 than the first surface 430b thereto. The cut trace 432 includes a first surface 432b, wherein a curvature center 432c of the first surface 432b is closer to the center 402 of the imaging lens element 400 than the first surface 432b thereto.

The cut trace 430 has a surface center 430a, and the cut trace 432 has a surface center 432a. A first connecting line L1 is defined between the surface center 430a of the cut trace 430 and the optical axis 412, a second connecting line L2 is defined between the surface center 432a of the cut trace 432 and the optical axis 412, and each of the first connecting line L1 and the second connecting line L2 is perpendicular to the optical axis 412. When an angle between the first connecting line L1 and the second connecting line L2 is θ1, a curvature radius of the first surface 430b is r, and a curvature radius of the outer diameter surface 420 is R, the following conditions are satisfied: 0.60<r/R<1.35; and 90 degrees<θ1≤180 degrees.

In particular, each of the cut trace 430 and the cut trace 432 can be corresponding to the injection inlet 480 of the imaging lens element 400 and a cut trace of the overflow area 490. The overflow area 490 can be provided to receive the welding line 495 or molding defects generated during the molding process of the molding article.

More preferably, when the curvature radius of the first surface 430b is r, and the curvature radius of the outer diameter surface 420 is R, the following condition can be satisfied: 0.72<r/R<1.20.

As shown in FIG. 4E, the optical effective section 410 can include a second surface 414a and a second surface 414b, wherein each of the second surface 414a and the second surface 414b can be from concave in a paraxial region thereof to convex in a peripheral region thereof.

As shown in FIG. 4D, each of the clearance surface 440 and the clearance surface 442 can be shrunk from the outer diameter reference plane (reference number is not shown) toward the center 402 of the imaging lens element 400. Furthermore, a number of the cut trace 430 and the cut trace 432 can be two, and the cut trace 430 and the cut trace 432 can be asymmetrically disposed on the outer diameter surface 420.

Furthermore, in FIG. 4E, when a central thickness of the imaging lens element 400 is CT, and a diameter of the outer diameter surface 420 is ϕ, the following conditions can be satisfied: CT<1.8 mm; and ϕ<12 mm.

In the 3rd embodiment, when the central thickness of the imaging lens element 400 is CT, the following condition can be satisfied: 0.25 mm<CT<0.95 mm. More preferably, the following condition can be satisfied: 0.25 mm<CT<0.70 mm. Even more preferably, the following condition can be satisfied: CT<0.50 mm.

In the 3rd embodiment, when the central thickness of the imaging lens element 400 is CT, and the curvature radius of the outer diameter surface 420 is R, the following condition can be satisfied: 6.0<R/CT<15.0. More preferably, the following condition can be satisfied: 7.5<R/CT<15.0.

As shown in FIG. 4E, the optical effective section 410 can further include an object-side optical effective section 416a and an image-side optical effective section 416b. When a diameter of the object-side optical effective section 416a is φi1, a diameter of the image-side optical effective section 416b is φi2, and the diameter of the outer diameter surface 420 is φ, the following conditions can be satisfied: 0.70<φi1/φ<1.0; and 0.70<φi2/φ<1.0. More preferably, the following conditions can be satisfied: 0.74<φi1/φ<1.0; and 0.82<φi2/φ<1.0.

Furthermore, as shown in FIG. 4E, when the angle between the first connecting line L1 and the second connecting line L2 is θ1, a maximum thickness of the imaging lens element 400 in a peripheral region thereof is ETmax, and a vertical distance between a position 418 of the maximum thickness and the optical axis 412 is (φETmax/2), the following conditions are satisfied: 0.20φ<φETmax<0.80φ; 1.0<ETmax/CT<4.5; and 90 degrees<θ1≤180 degrees (φETmax is defined as a specific parameter but not a multiplying value of φ and ETmax).

Furthermore, the position 418 of the maximum thickness of the imaging lens element 400 in the peripheral region thereof can be located in the optical effective section 410. Moreover, when the diameter of the object-side optical effective section 416a is φi1, the diameter of the image-side optical effective section 416b is φi2, and the vertical distance between the position 418 of the maximum thickness and the optical axis 412 is (φETmax/2), the following conditions are satisfied: φETmax<φi1; and φETmax<φi2.

Figure 4F:
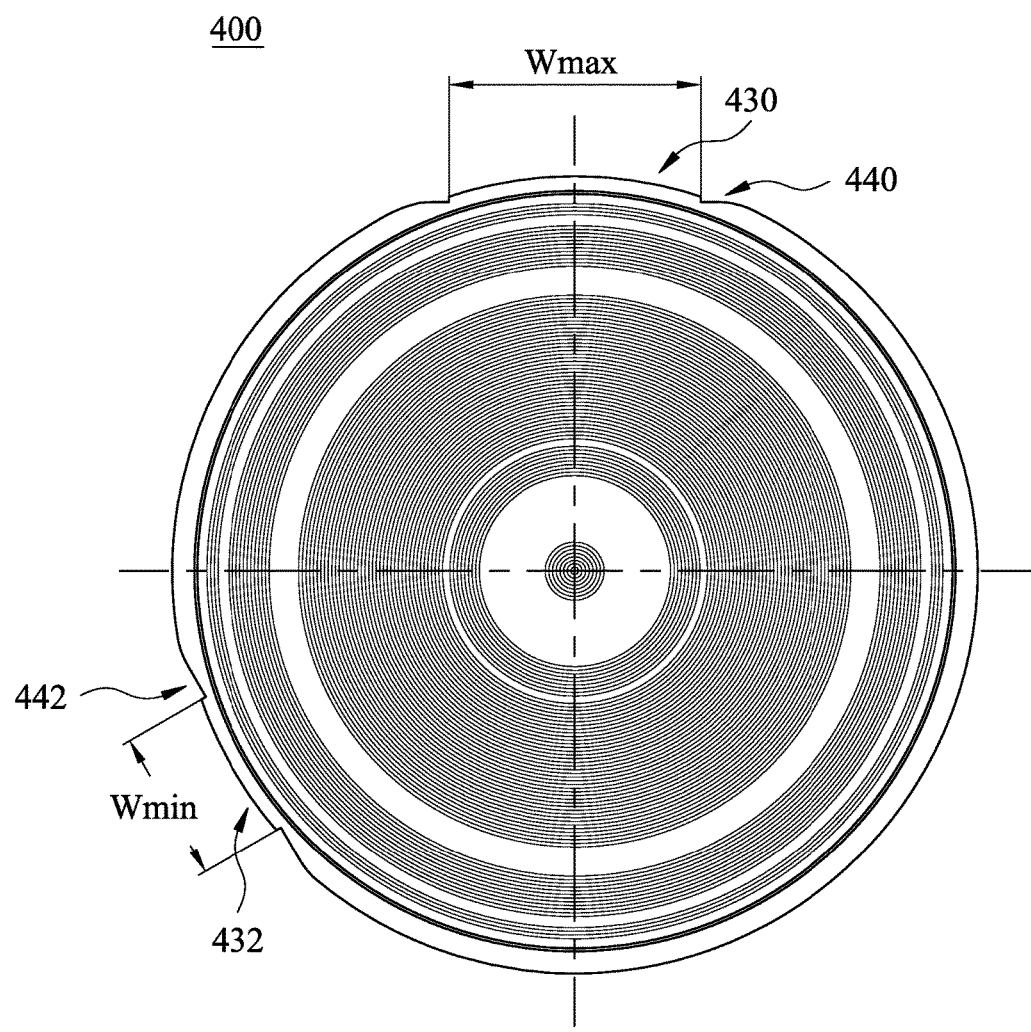
FIG. 4F is a front view of the imaging lens element according to the 3rd embodiment of the present disclosure.
Figure 4G:
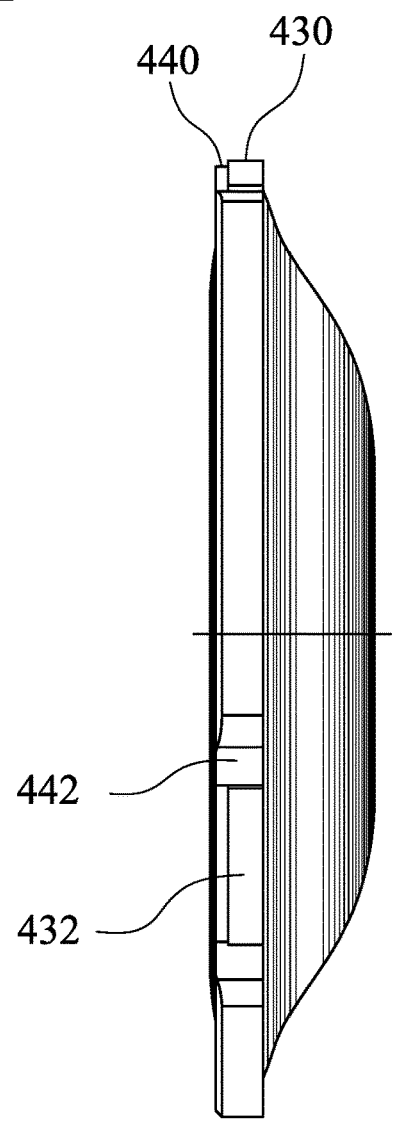
FIG. 4G is a side view of the imaging lens element according to the 3rd embodiment of the present disclosure.

FIG. 4F is a front view of the imaging lens element 400 according to the 3rd embodiment of the present disclosure. FIG. 4G is a side view of the imaging lens element 400 according to the 3rd embodiment of the present disclosure. As shown in FIG. 4F and FIG. 4G, when a maximum of widths of the cut trace 430 and the cut trace 432 is Wmax, and a minimum of widths of the cut trace 430 and the cut trace 432 is Wmin, the following condition can be satisfied: 1.25<Wmax/Wmin<3.5.

Figure 4H:
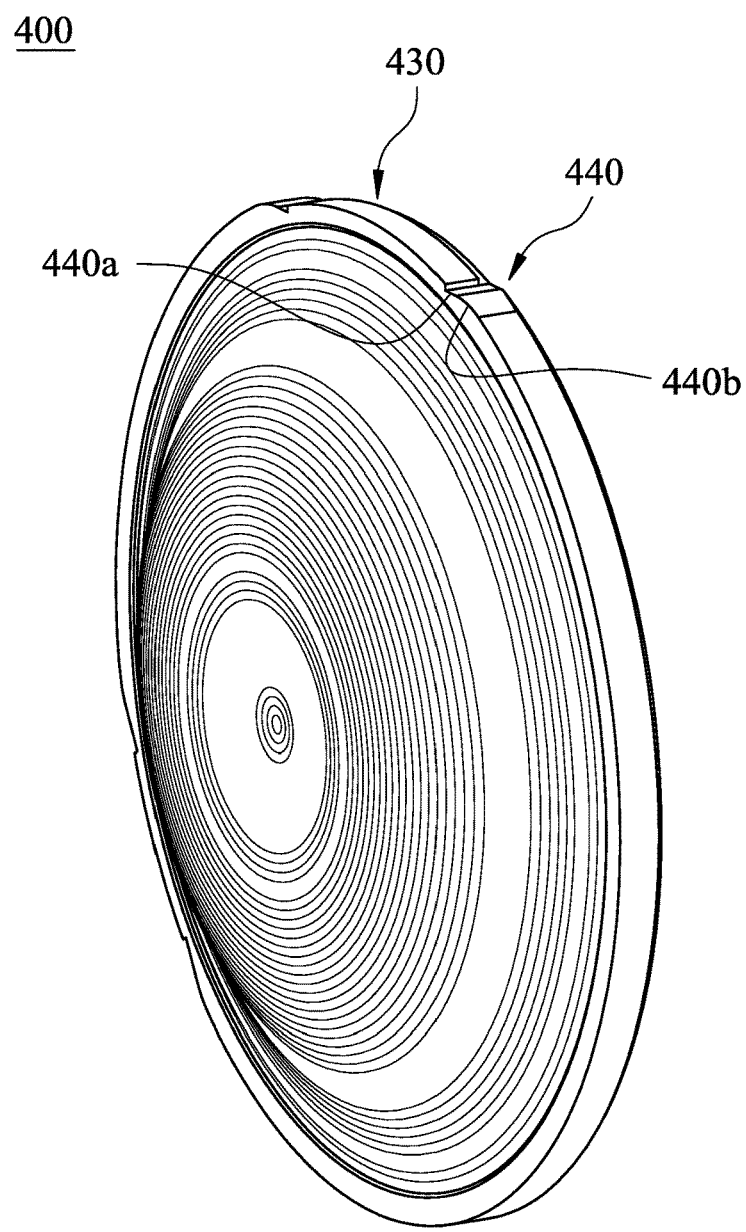
FIG. 4H is a three-dimensional schematic view of the imaging lens element according to the 3rd embodiment of the present disclosure.
Figure 4I:
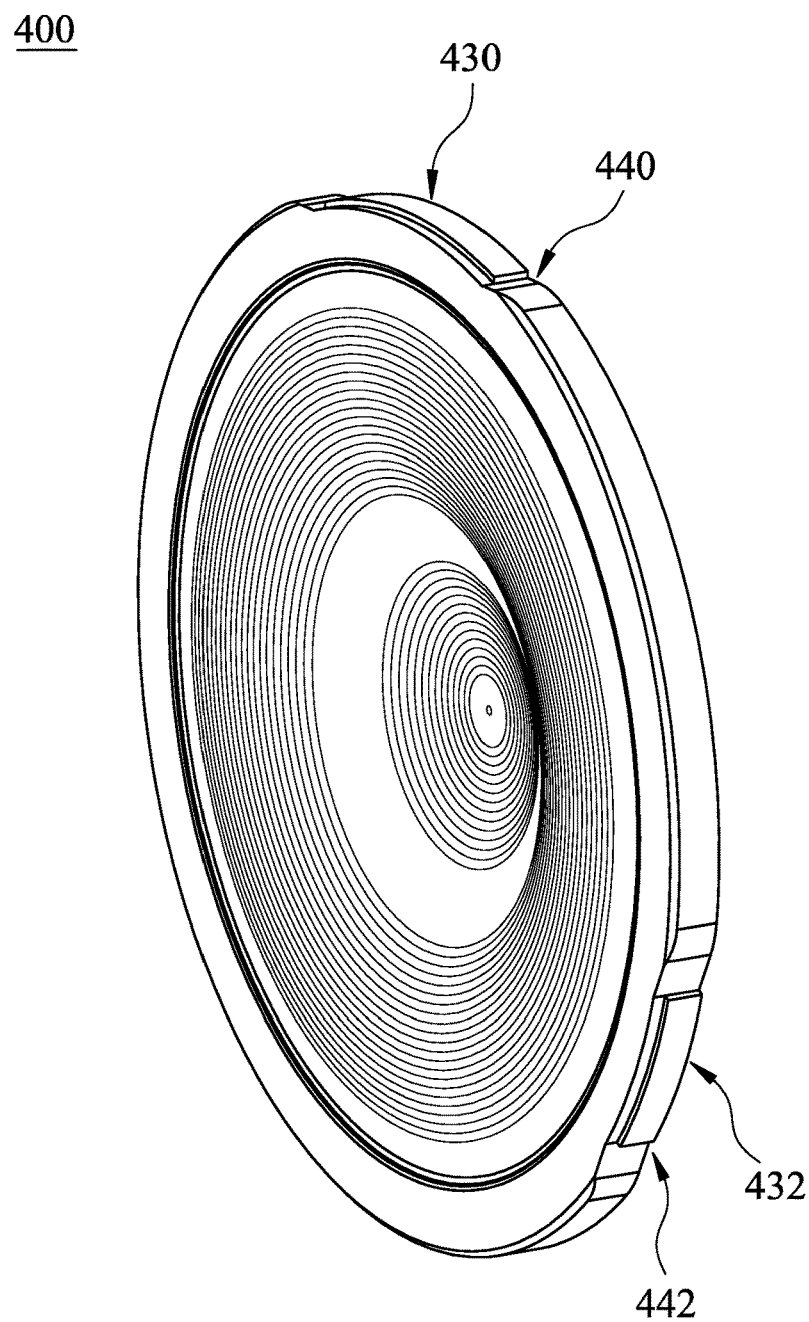
FIG. 4I is another three-dimensional schematic view of the imaging lens element according to the 3rd embodiment of the present disclosure.

FIG. 4H is a three-dimensional schematic view of the imaging lens element 400 according to the 3rd embodiment of the present disclosure. FIG. 4I is another three-dimensional schematic view of the imaging lens element 400 according to the 3rd embodiment of the present disclosure. As shown in FIG. 4H, the clearance surface 440 can include a plane 440a and a third surface 440b having a curvature radius.

The detailed data of the aforementioned parameters of the imaging lens element 400 in the 3rd embodiment of the present disclosure are shown in Table 3 below, and as shown in FIG. 4D, FIG. 4E and FIG. 4F.

TABLE 3

| 3rd embodiment | |
|---|---|
| r | 3.925 mm |
| R | 4 mm |
| Φ | 8 mm |
| ΦETmax | 4.118 mm |

TABLE 3-continued

| 3rd embodiment | |
|---|---|
| ETmax | 1.165 mm |
| θ1 | 120 degrees |
| CT | 0.467 mm |
| Wmax | 2.5 mm |
| Wmin | 1.5 mm |
| Φi1 | 6.8 mm |
| Φi2 | 7.5 mm |
| ETmax/CT | 2.495 |

4th Embodiment

Figure 5A:
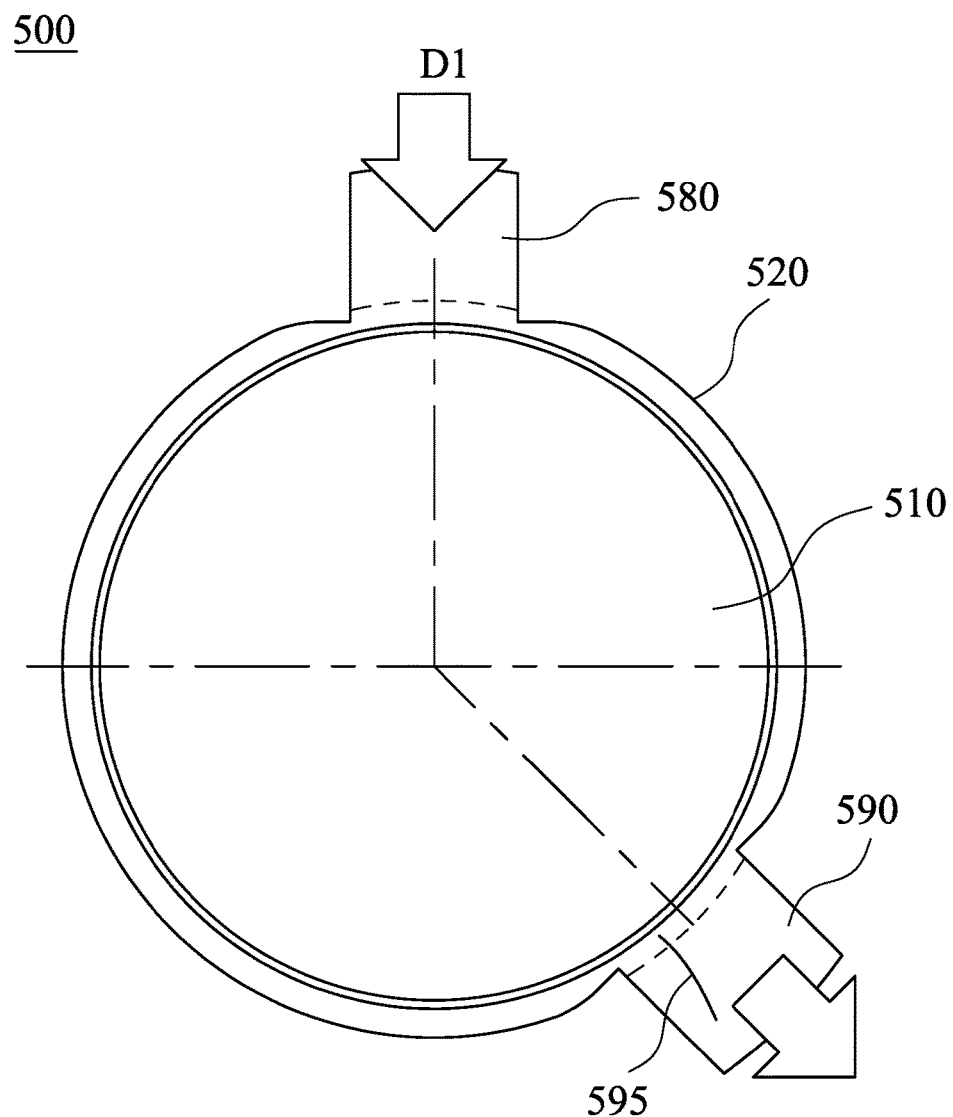
FIG. 5A is a perfusion schematic view of a molding article of an imaging lens element according to the 4th embodiment of the present disclosure.

FIG. 5A is a perfusion schematic view of a molding article of an imaging lens element 500 according to the 4th embodiment of the present disclosure. As shown in FIG. 5A, the molding article can be perfused from an injection inlet 580 into the imaging lens element 500 along a direction D1. Since the redundant molding article can flow out to an overflow area 590, the molding defects, such as a welding line 595 etc., will not appear within an optical effective section 510. Furthermore, the imaging lens element 500 can be made by a single-molded process, and the imaging lens element 500 can include only one injection inlet 580. Thereafter, the injection inlet 580 and the overflow area 590 can be cut off so as to leave corresponding cut traces on an outer diameter surface 520. The details are shown below.

Figure 5B:
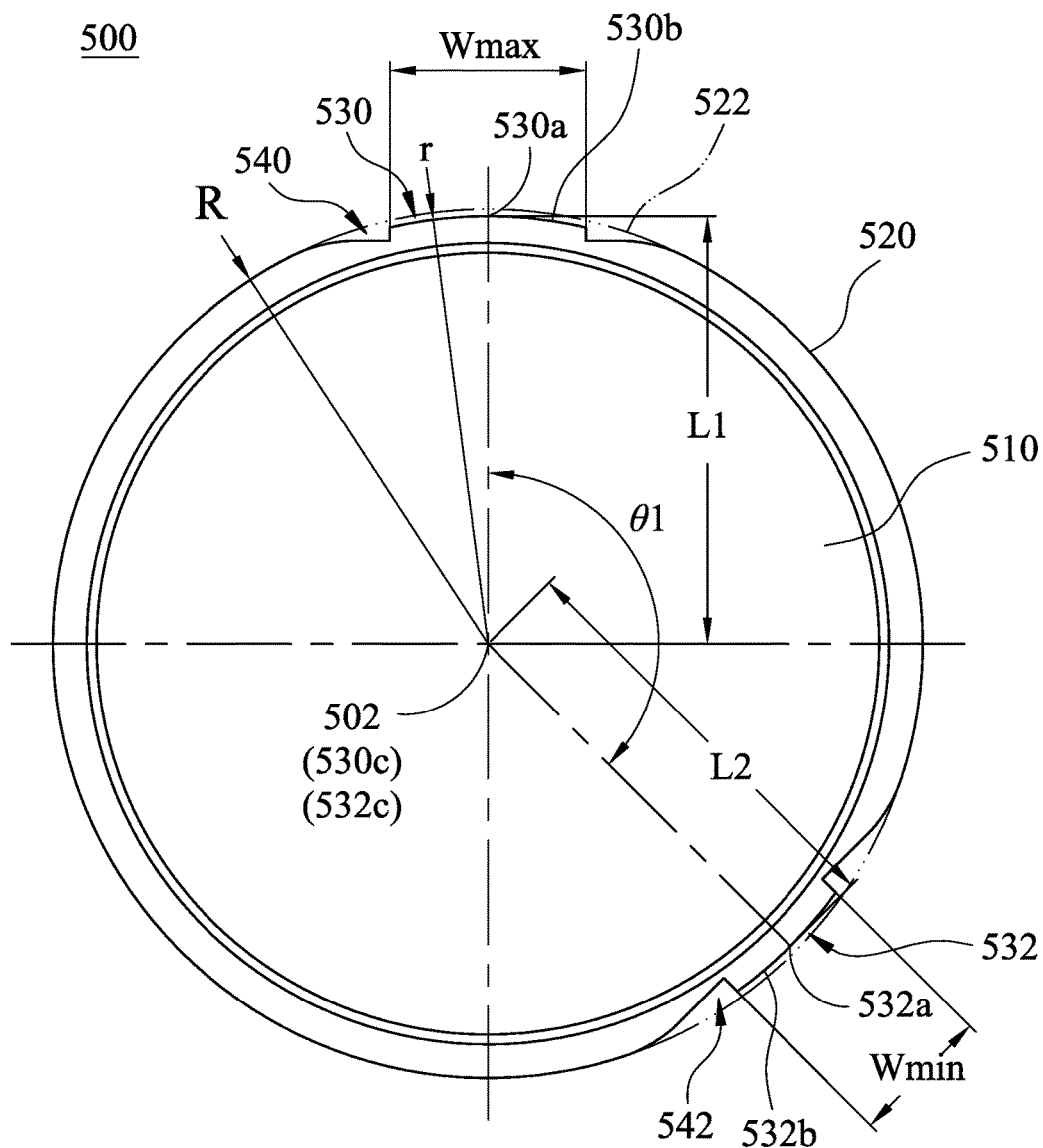
FIG. 5B is a schematic view of the imaging lens element according to the 4th embodiment of the present disclosure.
Figure 5C:
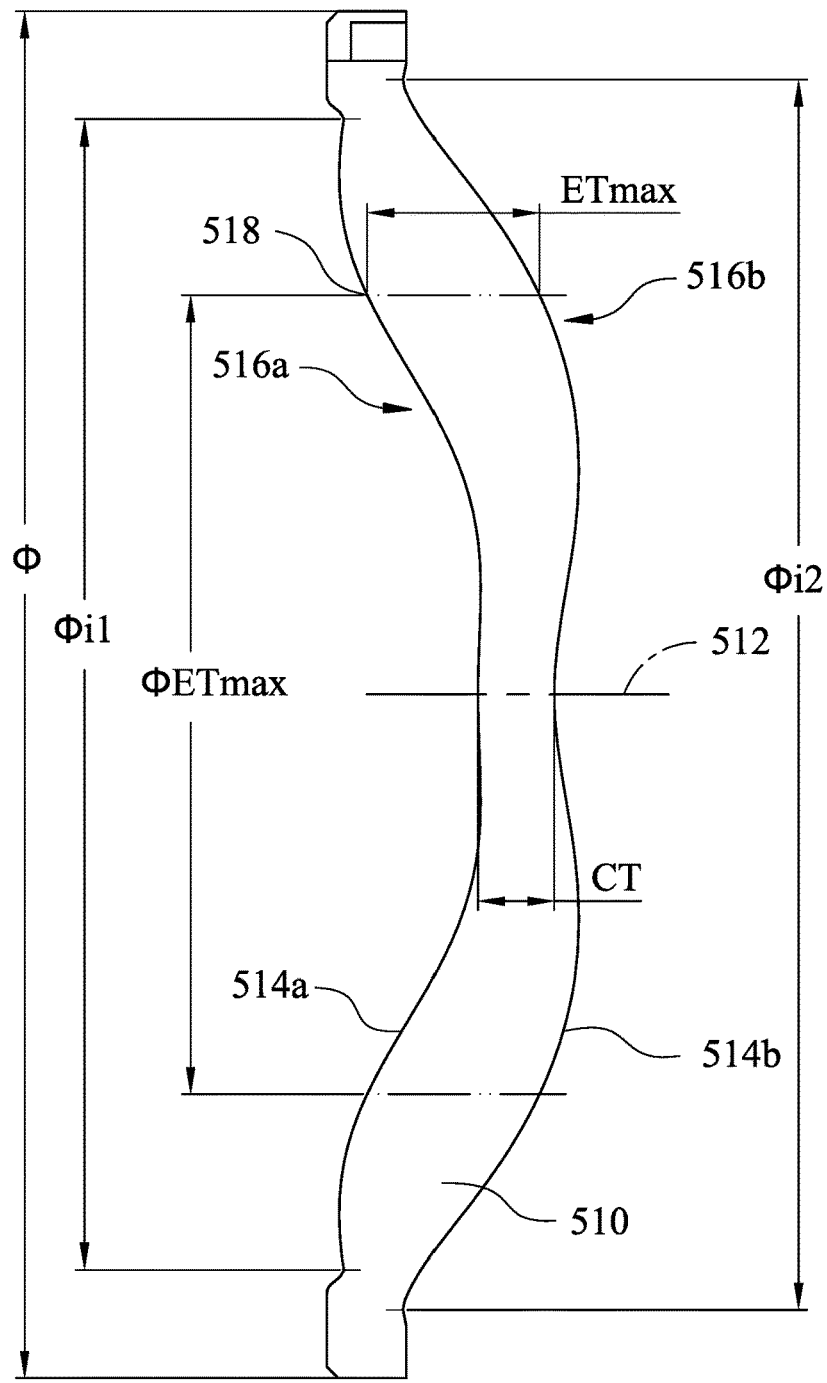
FIG. 5C is a cross-sectional view of the imaging lens element according to the 4th embodiment of the present disclosure.

FIG. 5B is a schematic view of the imaging lens element 500 according to the 4th embodiment of the present disclosure. FIG. 5C is a cross-sectional view of the imaging lens element 500 according to the 4th embodiment of the present disclosure. As shown in FIG. 5B and FIG. 5C, the imaging lens element 500 of the 4th embodiment includes an optical effective section 510, an outer diameter surface 520, a cut trace 530, a cut trace 532, a clearance surface 540 and a clearance surface 542. The optical effective section 510 has an optical axis 512. The outer diameter surface 520 surrounds the optical effective section 510. Each of the cut trace 530 and the cut trace 532 is shrunk from an outer diameter reference plane 522 of the outer diameter surface 520 toward a center 502 (which is corresponding to the optical axis 512) of the imaging lens element 500. The clearance surface 540 is connected between the cut trace 530 and the outer diameter surface 520, and the clearance surface 542 is connected between the cut trace 532 and the outer diameter surface 520.

The cut trace 530 includes a first surface 530b, wherein a curvature center 530c of the first surface 530b is closer to the center 502 of the imaging lens element 500 than the first surface 530b thereto. The cut trace 532 includes a first surface 532b, wherein a curvature center 532c of the first surface 532b is closer to the center 502 of the imaging lens element 500 than the first surface 532b thereto.

The cut trace 530 has a surface center 530a, and the cut trace 532 has a surface center 532a. A first connecting line L1 is defined between the surface center 530a of the cut trace 530 and the optical axis 512, a second connecting line L2 is defined between the surface center 532a of the cut trace 532 and the optical axis 512, and each of the first connecting line L1 and the second connecting line L2 is perpendicular to the optical axis 512. When an angle between the first connecting line L1 and the second connecting line L2 is θ1, a curvature radius of the first surface 530b is r, and a curvature radius of the outer diameter surface 520 is R, the following conditions are satisfied: 0.60<r/R<1.35; and 90 degrees<θ1≤180 degrees.

In particular, each of the cut trace 530 and the cut trace 532 can be corresponding to the injection inlet 580 of the imaging lens element 500 and a cut trace of the overflow area 590. The overflow area 590 can be provided to receive the welding line 595 or molding defects generated during the molding process of the molding article.

More preferably, when the curvature radius of the first surface 530b is r, and the curvature radius of the outer diameter surface 520 is R, the following condition can be satisfied: 0.72<r/R<1.20.

As shown in FIG. 5C, the optical effective section 510 can include a second surface 514a and a second surface 514b, wherein each of the second surface 514a and the second surface 514b can be from concave in a paraxial region thereof to convex in a peripheral region thereof.

As shown in FIG. 5B, each of the clearance surface 540 and the clearance surface 542 can be shrunk from the outer diameter reference plane 522 toward the center 502 of the imaging lens element 500. Furthermore, a number of the cut trace 530 and the cut trace 532 can be two, and the cut trace 530 and the cut trace 532 can be asymmetrically disposed on the outer diameter surface 520.

Furthermore, in FIG. 5C, when a central thickness of the imaging lens element 500 is CT, and a diameter of the outer diameter surface 520 is ϕ, the following conditions can be satisfied: CT<1.8 mm; and I<12 mm. In the 4th embodiment, when the central thickness of the imaging lens element 500 is CT, the following condition can be satisfied: 0.25 mm<CT<0.95 mm. More preferably, the following condition can be satisfied: 0.25 mm<CT<0.70 mm. Even more preferably, the following condition can be satisfied: CT<0.50 mm.

In the 4th embodiment, when the central thickness of the imaging lens element 500 is CT, and the curvature radius of the outer diameter surface 520 is R, the following condition can be satisfied: 6.0<R/CT<15.0. More preferably, the following condition can be satisfied: 7.5<R/CT<15.0.

As shown in FIG. 5C, the optical effective section 510 can further include an object-side optical effective section 516a and an image-side optical effective section 516b. When a diameter of the object-side optical effective section 516a is ϕi1, a diameter of the image-side optical effective section 516b is ϕi2, and the diameter of the outer diameter surface 520 is ϕ, the following conditions can be satisfied: 0.70<ϕi1/ϕ<1.0; and 0.70<ϕi2/ϕ<1.0. More preferably, the following conditions can be satisfied: 0.74<ϕi1/ϕ<1.0; and 0.82<ϕi2/ϕ<1.0.

Furthermore, as shown in FIG. 5B, when the angle between the first connecting line L1 and the second connecting line L2 is θ1, a maximum thickness of the imaging lens element 500 in a peripheral region thereof is ETmax, and a vertical distance between a position 518 of the maximum thickness and the optical axis 512 is (ϕETmax/2), the following conditions are satisfied: 0.20ϕ<ϕETmax<0.80ϕ; 1.0<ETmax/CT<4.5; and 90 degrees<θ1≤180 degrees (ϕETmax is defined as a specific parameter but not a multiplying value of ϕ and ETmax).

Furthermore, the position 518 of the maximum thickness of the imaging lens element 500 in the peripheral region thereof can be located in the optical effective section 510. Moreover, when the diameter of the object-side optical effective section 516a is ϕi1, the diameter of the image-side optical effective section 516b is ϕi2, and the vertical distance between the position 518 of the maximum thickness and the optical axis 512 is (ϕETmax/2), the following conditions can be satisfied: ϕETmax<ϕi1; and ϕETmax<ϕi2.

Furthermore, when a maximum of widths of the cut trace 530 and the cut trace 532 is Wmax, and a minimum of widths of the cut trace 530 and the cut trace 532 is Wmin, the following condition can be satisfied: 1.25<Wmax/Wmin<3.5.

The detailed data of the aforementioned parameters of the imaging lens element 500 in the 4th embodiment of the present disclosure are shown in Table 4 below, and as shown in FIG. 5B and FIG. 5C.

TABLE 4

| 4th embodiment | |
|---|---|
| r | 3.05 mm |
| R | 3.1 mm |
| Φ | 6 mm |
| ΦETmax | 3.623 mm |
| ETmax | 0.781 mm |
| θ1 | 135 degrees |
| CT | 0.347 mm |
| Wmax | 1.4 mm |
| Wmin | 1 mm |
| Φi1 | 5.22 mm |
| Φi2 | 5.58 mm |
| ETmax/CT | 2.25 |

5th Embodiment

Figure 6A:
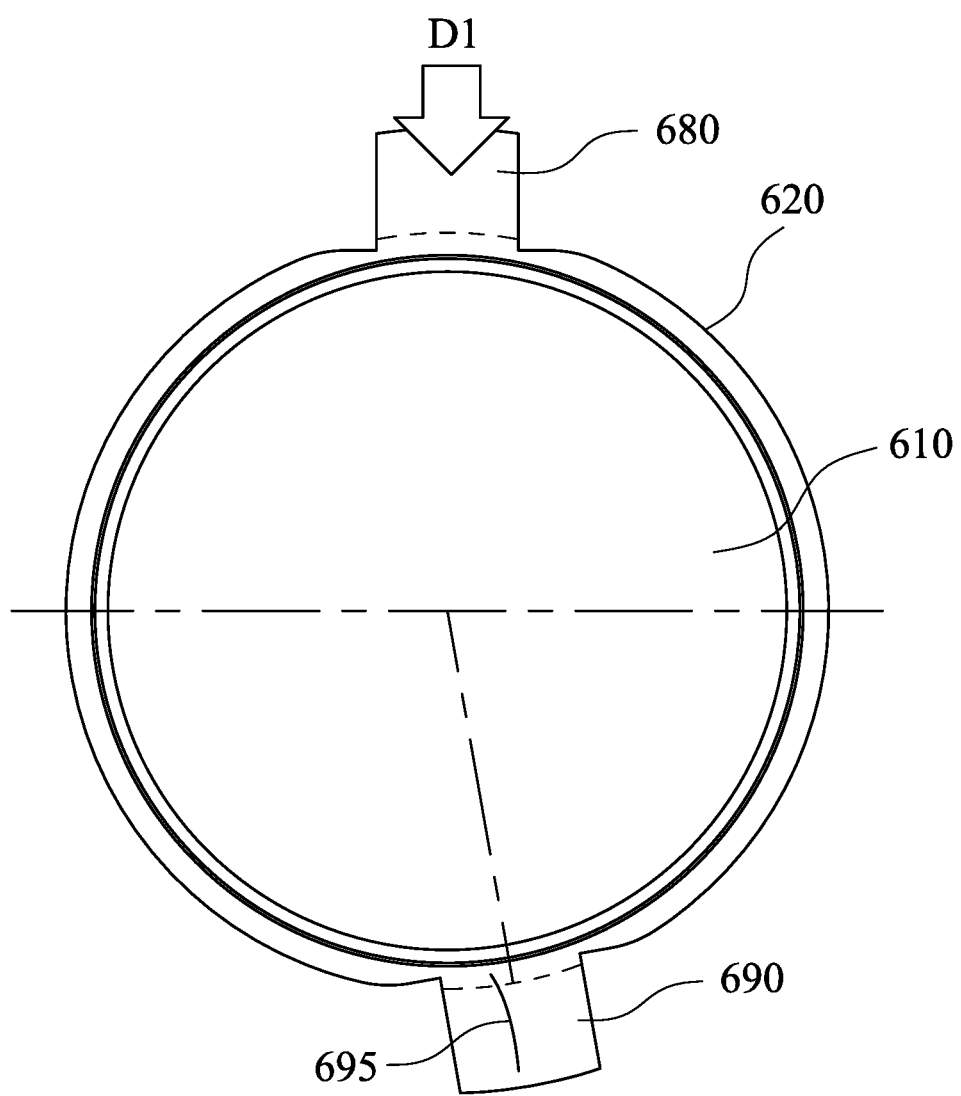
FIG. 6A is a perfusion schematic view of a molding article of an imaging lens element according to the 5th embodiment of the present disclosure.

FIG. 6A is a perfusion schematic view of a molding article of an imaging lens element 600 according to the 5th embodiment of the present disclosure. As shown in FIG. 6A, the molding article can be perfused from an injection inlet 680 into the imaging lens element 600 along a direction D1. Since the redundant molding article can flow out to an overflow area 690, the molding defects, such as a welding line 695 etc., will not appear within an optical effective section 610. Furthermore, the imaging lens element 600 can be made by a single-molded process, and the imaging lens element 600 can include only one injection inlet 680. Thereafter, the injection inlet 680 and the overflow area 690 can be cut off so as to leave corresponding cut traces on an outer diameter surface 620. The details are shown below.

Figure 6B:
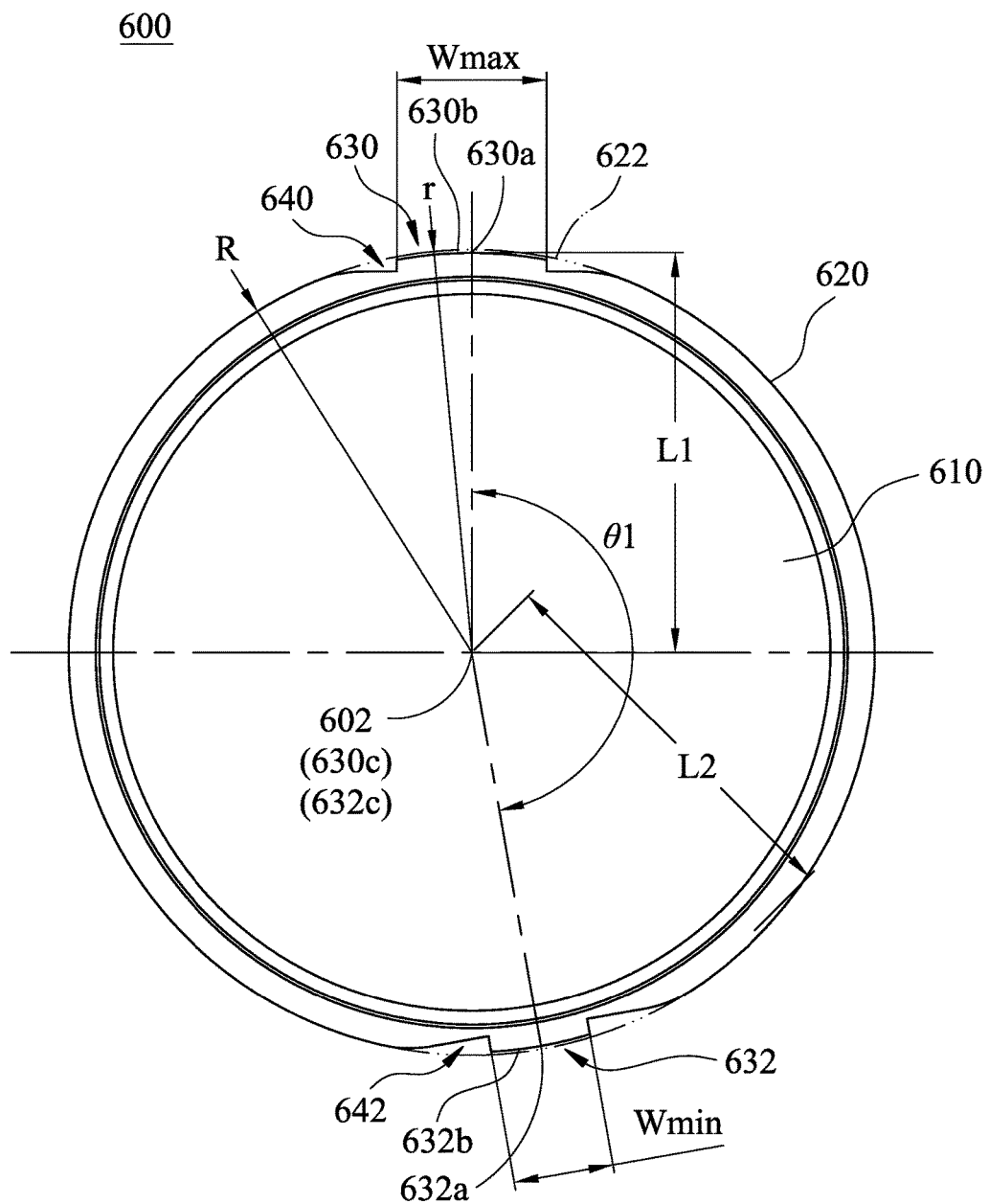
FIG. 6B is a schematic view of the imaging lens element according to the 5th embodiment of the present disclosure.
Figure 6C:
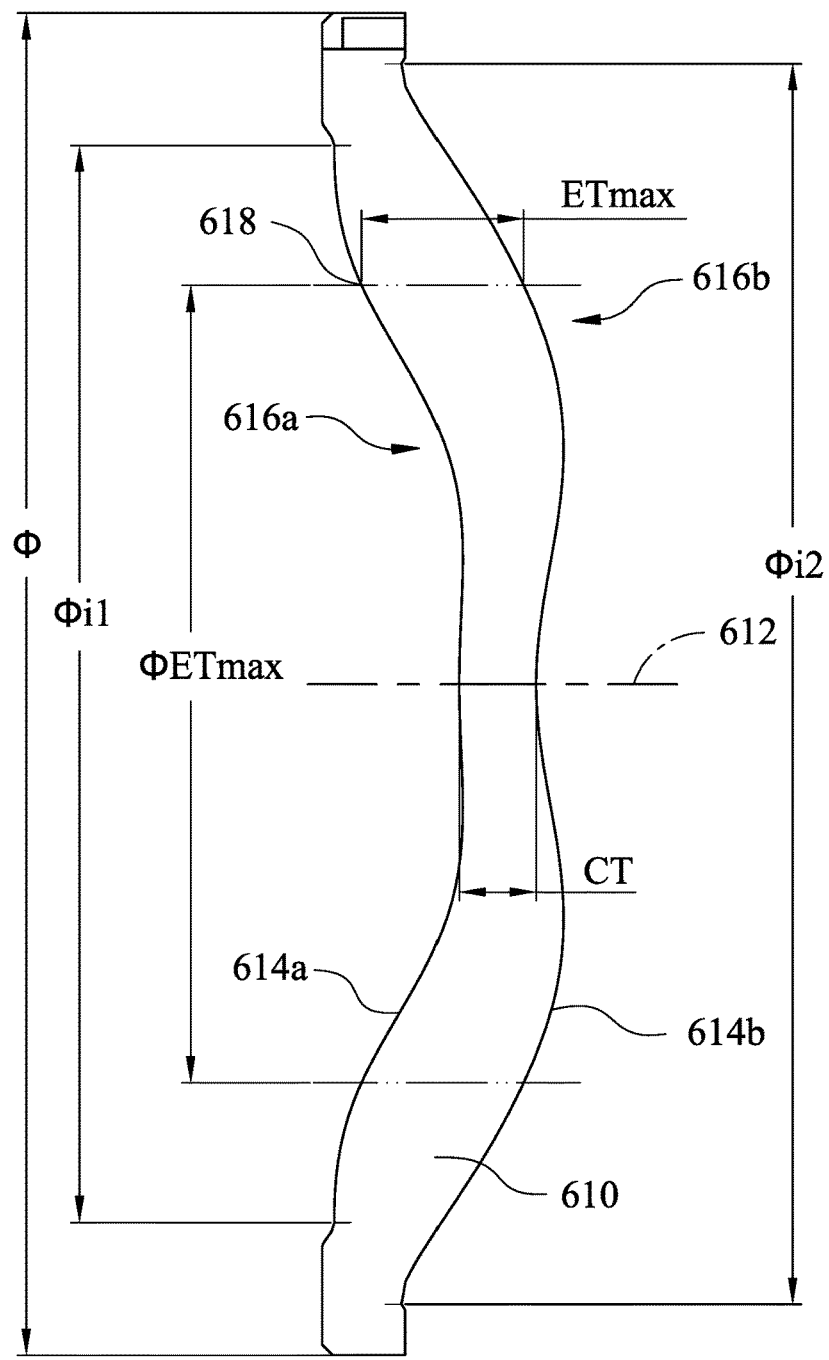
FIG. 6C is a cross-sectional view of the imaging lens element according to the 5th embodiment of the present disclosure.

FIG. 6B is a schematic view of the imaging lens element 600 according to the 5th embodiment of the present disclosure. FIG. 6C is a cross-sectional view of the imaging lens element 600 according to the 5th embodiment of the present disclosure. As shown in FIG. 6B and FIG. 6C, the imaging lens element 600 of the 5th embodiment includes an optical effective section 610, an outer diameter surface 620, a cut trace 630, a cut trace 632, a clearance surface 640 and a clearance surface 642. The optical effective section 610 has an optical axis 612. The outer diameter surface 620 surrounds the optical effective section 610. Each of the cut trace 630 and cut trace 632 is shrunk from an outer diameter reference plane 622 of the outer diameter surface 620 toward a center 602 (which is corresponding to the optical axis 612) of the imaging lens element 600. The clearance surface 640 is connected between the cut trace 630 and the outer diameter surface 620, and the clearance surface 642 is connected between the cut trace 632 and the outer diameter surface 620.

The cut trace 630 includes a first surface 630b, wherein a curvature center 630c of the first surface 630b is closer to the center 602 of the imaging to lens element 600 than the first surface 630b thereto. The cut trace 632 includes a first surface 632b, wherein a curvature center 632c of the first surface 632b is closer to the center 602 of the imaging lens element 600 than the first surface 632b thereto.

The cut trace 630 has a surface center 630a, and a cut trace 632 has a surface center 632a. A first connecting line L1 is defined between the surface center 630a of the cut trace 630 and the optical axis 612, a second connecting line L2 is defined between the surface center 632a of the cut trace 632 and the optical axis 612, and each of the first connecting line L1 and the second connecting line L2 is perpendicular to the optical axis 612. When an angle between the first connecting line L1 and the second connecting line L2 is θ1, a curvature radius of the first surface 630b is r, and a curvature radius of the outer diameter surface 620 is R, the following conditions are satisfied: 0.60<r/R<1.35; and 90 degrees<θ1≤180 degrees.

In particular, each of the cut trace 630 and cut trace 632 can be corresponding to the injection inlet 680 of the imaging lens element 600 and a cut trace of the overflow area 690. The overflow area 690 can be provided to receive the welding line 695 or molding defects generated during the molding process of the molding article.

More preferably, when the curvature radius of the first surface 630b is r, and the curvature radius of the outer diameter surface 620 is R, the following condition can be satisfied: 0.72<r/R<1.20.

As shown in FIG. 6C, the optical effective section 610 can include a second surface 614a and a second surface 614b, wherein each of the second surface 614a and the second surface 614b can be from concave in a paraxial region thereof to convex in a peripheral region thereof.

As shown in FIG. 6B, each of the clearance surface 640 and the clearance surface 642 can be shrunk from the outer diameter reference plane 622 toward the center 602 of the imaging lens element 600. Furthermore, a number of the cut trace 630 and the cut trace 632 can be two, and the cut trace 630 and the cut trace 632 can be asymmetrically disposed on the outer diameter surface 620.

Furthermore, in FIG. 6C, when a central thickness of the imaging lens element 600 is CT, and a diameter of the outer diameter surface 620 is ϕ, the following condition can be satisfied: CT<1.8 mm; and ϕ<12 mm.

In the 5th embodiment, when the central thickness of the imaging lens element 600 is CT, the following condition can be satisfied: 0.25 mm<CT<0.95 mm. More preferably, the following condition can be satisfied: 0.25 mm<CT<0.70 mm. Even more preferably, the following condition can be satisfied: CT<0.50 mm.

In the 5th embodiment, when the central thickness of the imaging lens element 600 is CT, and the curvature radius of the outer diameter surface 620 is R, the following condition can be satisfied: 6.0<R/CT<15.0. More preferably, the following condition can be satisfied: 7.5<R/CT<15.0.

As shown in FIG. 6C, the optical effective section 610 can further include an object-side optical effective section 616a and an image-side optical effective section 616b. When a diameter of the object-side optical effective section 616a is ϕi1, a diameter of the image-side optical effective section 616b is ϕi2, and the diameter of the outer diameter surface is ϕ, the following conditions can be satisfied: 0.70<ϕi1/ϕ<1.0; and 0.70<ϕi2/ϕ<1.0. More preferably, the following conditions can be satisfied: 0.74<ϕi1/ϕ<1.0; and 0.82<ϕi2/ϕ<1.0.

Furthermore, as shown in FIG. 6B, when the angle between the first connecting line L1 and the second connecting line L2 is θ1, a maximum thickness of the imaging lens element 600 in a peripheral region thereof is ETmax, and a vertical distance between a position 618 of the maximum thickness and the optical axis 612 is (ϕETmax/2), the following conditions are satisfied: 0.20ϕ<ϕETmax<0.80ϕ; 1.0<ETmax/CT<4.5; and 90 degrees<θ1≤180 degrees (ϕETmax is defined as a specific parameter but not a multiplying value of ϕ and ETmax).

Furthermore, the position 618 of the maximum thickness of the imaging lens element 600 in the peripheral region thereof can be located in the optical effective section 610. Moreover, when the diameter of the object-side optical effective section 616a is ϕi1, the diameter of the image-side optical effective section 616b is ϕi2, and the vertical distance between the position 618 of the maximum thickness and the optical axis 612 is (ϕETmax/2), the following condition can be satisfied: ϕETmax<ϕi1; and ϕETmax<ϕi2.

Furthermore, when a maximum of widths of the cut trace 630 and the cut trace 632 is Wmax, and a minimum of widths of the cut trace 630 and the cut trace 632 is Wmin, the following condition can be satisfied: 1.25<Wmax/Wmin<3.5.

The detailed data of the aforementioned parameters of the imaging lens element 600 in the 5th embodiment of the present disclosure are shown in Table 5 below, and as shown in FIG. 6B and FIG. 6C.

TABLE 5

| 5th embodiment | |
|---|---|
| r | 3.2 mm |
| R | 3.225 mm |
| Φ | 6 mm |
| ΦETmax | 3.833 mm |
| ETmax | 0.778 mm |
| θ1 | 170 degrees |
| CT | 0.37 mm |
| Wmax | 1.2 mm |
| Wmin | 0.8 mm |
| Φi1 | 5.18 mm |
| Φi2 | 5.96 mm |
| ETmax/CT | 2.103 |

6th Embodiment

Figure 7:
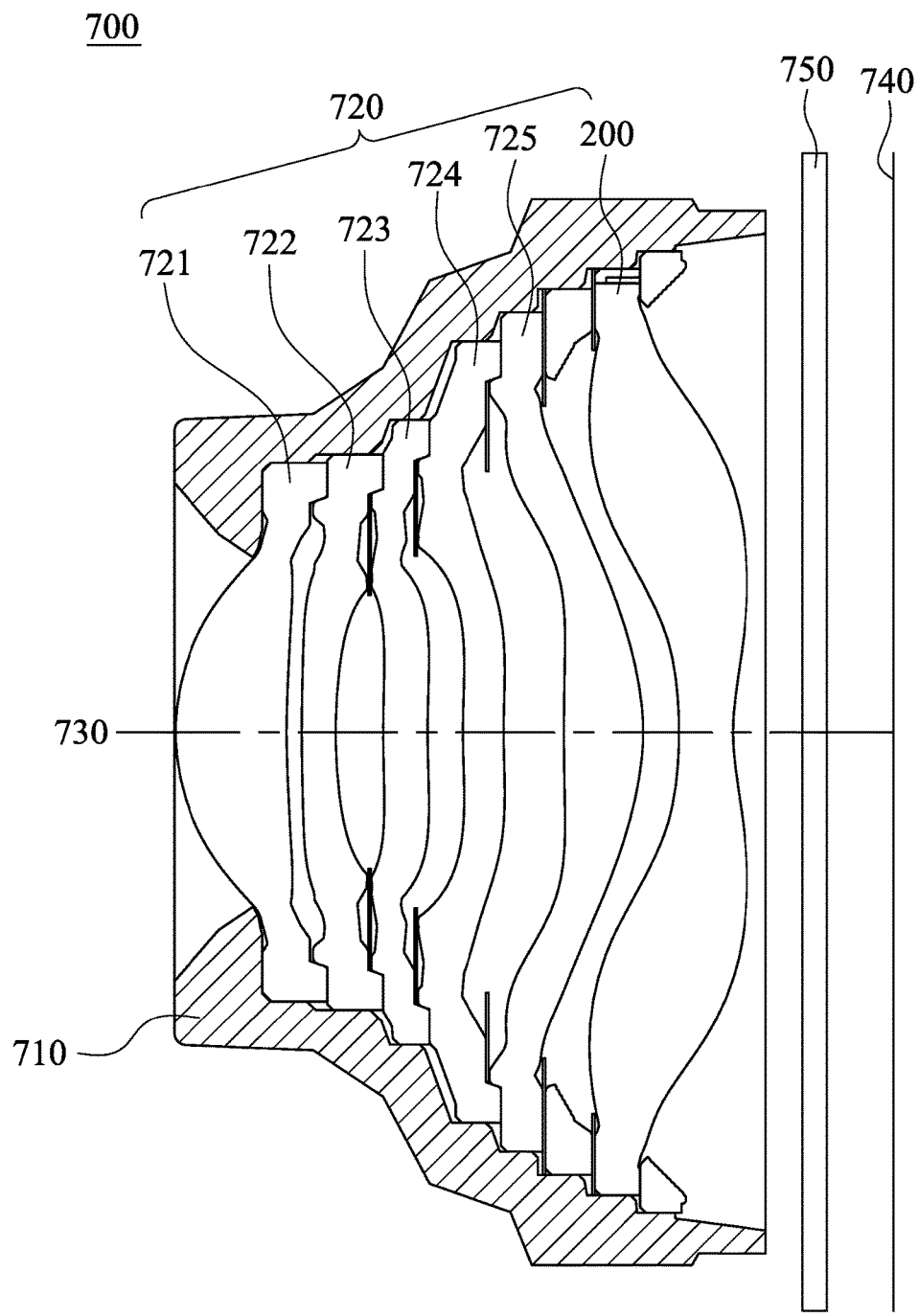
FIG. 7 is a cross-sectional view of a camera module according to the 6th embodiment of the present disclosure.

FIG. 7 is a cross-sectional view of a camera module 700 according to the 6th embodiment of the present disclosure. In FIG. 7, the camera module 700 includes a plastic barrel member 710 and an optical lens assembly 720. The optical lens assembly 720 is disposed in the plastic barrel member 710, and the optical lens assembly 720 includes, in order from an object-side to an image-side, a lens element 721, a lens element 722, a lens element 723, a lens element 724, a lens element 725, the imaging lens element 200, a glass panel 750 and an image surface 740, wherein the imaging lens element 200 is the same as that in the 1st embodiment, the optical lens assembly 720 includes six lens elements (that is, lens element 721, lens element 722, lens element 723, lens element 724, lens element 725 and the imaging lens element 200), and all of the lens element 721, the lens element 722, the lens element 723, the lens element 724, the lens element 725 and the imaging lens element 200 are disposed in the plastic barrel member 710 along the optical axis 730 of the optical lens assembly 720. In other embodiments (not shown in Figures), the optical lens assembly 720 can include four lens elements, five lens elements, seven lens elements or more. The glass panel 750 can be a cover glass element, a filter, or both, and will not affect the focal length of the set of the optical lens assembly 720.

In other embodiments, the imaging lens element 200 of the camera module 700 can be replaced with the imaging lens element 300 of the 2nd embodiment, the imaging lens element 400 of the 3rd embodiment, the imaging lens element 500 of the 4th embodiment, or the imaging lens element 600 of the 5th embodiment. Because welding lines or other molding defects will not appear within all of the imaging lens element 200, the imaging lens element 300, the imaging lens element 400, the imaging lens element 500 and the imaging lens element 600, so that the light converging condition of imaging light can be improved so as to increase the resolution of the camera module 700. Furthermore, a path of the imaging light can be maintained easily so as to obtain a clearer image.

7th Embodiment

Figure 8A:
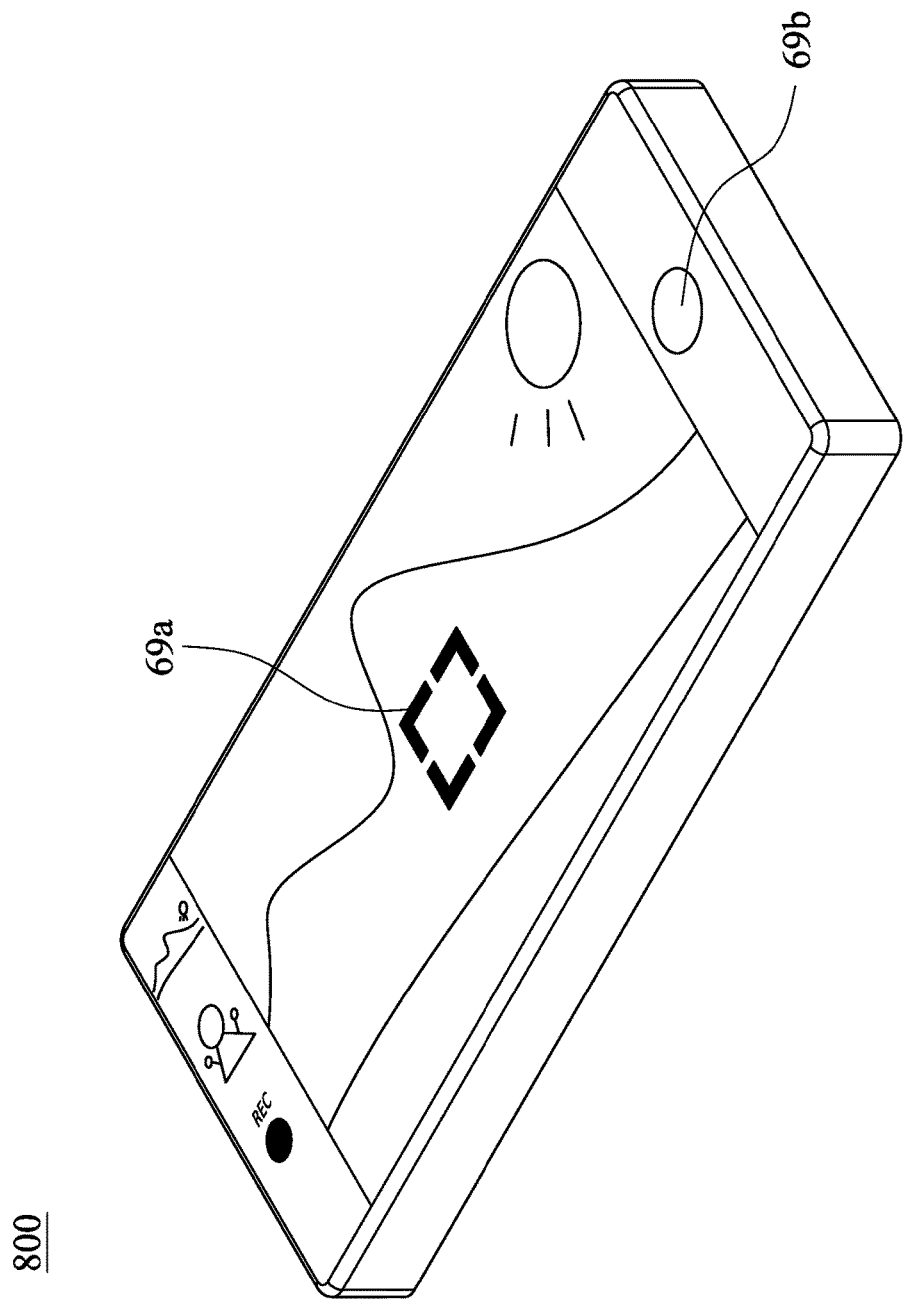
FIG. 8A is a schematic view of an electronic device according to the 7th embodiment of the present disclosure.
Figure 8B:
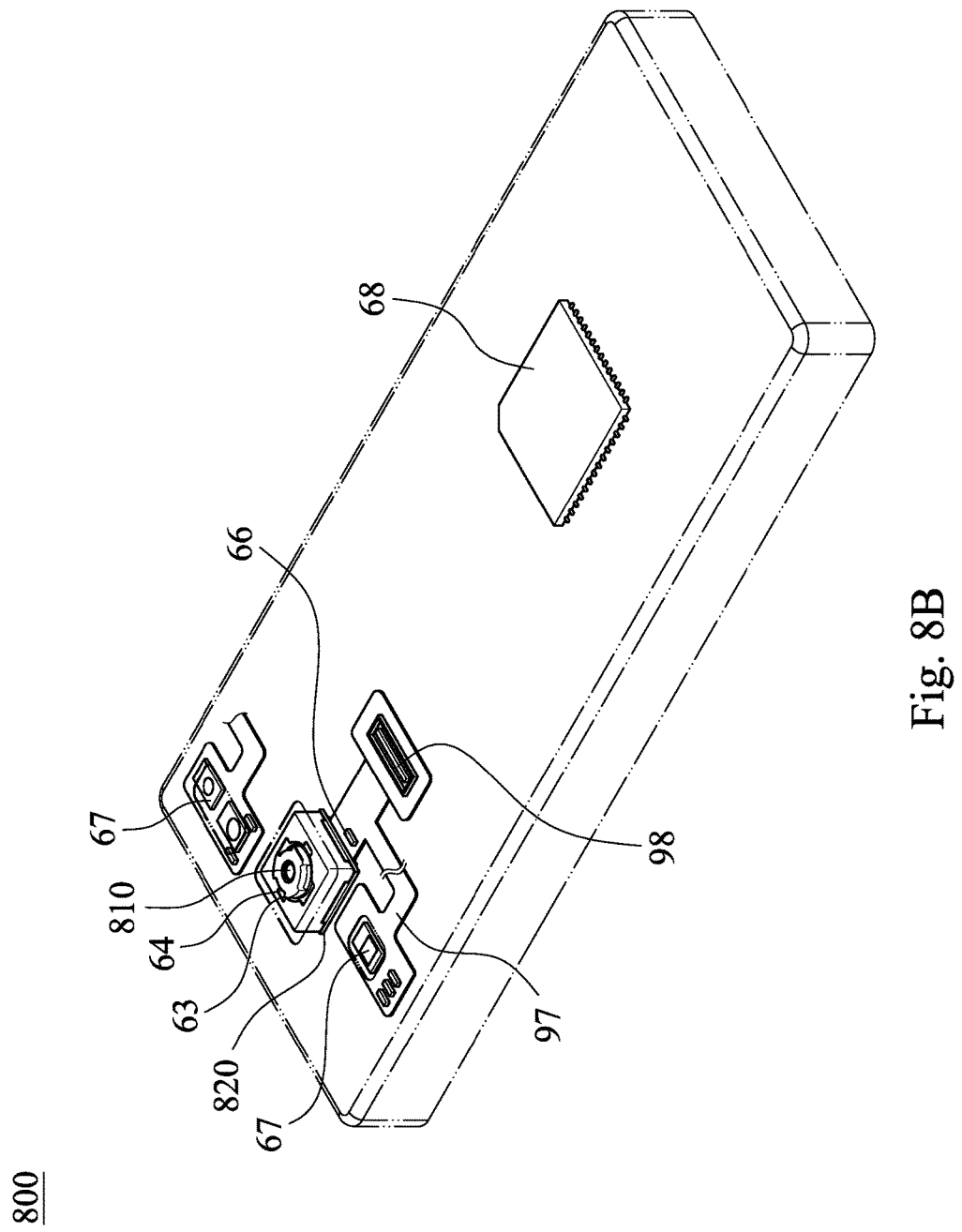
FIG. 8B is another schematic view of the electronic device according to the 7th embodiment.

FIG. 8A is a schematic view of an electronic device 800 according to the 7th embodiment of the present disclosure. FIG. 8B is another schematic view of the electronic device 800 according to the 7th embodiment. Particularly, FIG. 8A and FIG. 8B are schematic views of a camera of the electronic device 800. As shown in FIG. 8A and FIG. 8B, the electronic device 800 of the 7th embodiment is a smart phone, and the electronic device 800 includes a camera module 810 of the present disclosure and an image sensor 820, wherein the image sensor 820 is disposed on the image surface (not shown) of the camera module 810. Therefore, marketing demands for mass production and outward appearance of the electronic devices can be achieved.

Specifically, the user activates the capturing mode by the user interface 69 of the electronic device 800, wherein the user interface 69 of the 7th embodiment can be a touch screen 69a, a button 69b, etc. At this moment, camera module 810 collects imaging light on the image sensor 820 and outputs electronic signals associated with images to an image signal processor (ISP) 68.

Figure 8C:
FIG. 8C is a block diagram of the electronic device according to the 7th embodiment.

FIG. 8C is a block diagram of the electronic device 800 according to the 7th embodiment, in particular, the block diagram of the camera of the electronic device 800. As shown in FIG. 8A and FIG. 8C, the electronic device 800 can further include an autofocus assembly 63 and an optical anti-shake mechanism 64 in response to the camera specification of the electronic device 800. Moreover, the electronic device 800 can further include at least one auxiliary optical component 67 and at least one sensing component 66. The auxiliary optical component 67 can be flash modules, infrared distance measurement components, laser focus modules and modules for compensating for color temperatures. The sensing component 66 can have functions for sensing physical momentum and kinetic energies, such as an accelerator, a gyroscope, and a hall effect element, so as to sense shaking or jitters applied by hands of the user or external environments, thus the autofocus assembly 63 and the optical anti-shake mechanism 64 disposed on the electronic device 800 can function to obtain great image quality and facilitate the electronic device 800 according to the present disclosure to have a capturing function with multiple modes, such as taking optimized selfies, high dynamic range (HDR) with a low light source, 4K resolution recording, etc. Furthermore, the user can visually see the captured image of the camera through the touch screen 69a and manually operate the view finding range on the touch screen 69a to achieve the auto focus function of what you see is what you get.

Furthermore, as shown in FIG. 8B, the camera module 810, the image sensor 820, the autofocus assembly 63, the optical anti-shake mechanism 64, the sensing component 66 and the auxiliary optical component 67 can be disposed on a flexible printed circuit board (FPC) 97 and electrically connected with the associated elements, such as an image signal processor 68, so as to perform a capturing process. Because the current electronic devices, such as smart phone, have a tendency of being light and thin, the way of disposing the imaging lens module and related elements on the flexible printed circuit board and then integrating the circuit into the main board of the electronic device via the connector can satisfy the mechanical design of the limited space inside the electronic device and the layout requirements, and obtain more margins. The auto focus function of the imaging lens module can be controlled more flexibly via the touch screen of the electronic device. In the 7th embodiment, the electronic device 800 includes a plurality of sensing components 66 and a plurality of auxiliary optical components 67, the sensing components 66 and the auxiliary optical components 67 are disposed on the flexible printed circuit board 77 and at least one other flexible printed circuit board (reference number is not shown) and electrically connected with the associated elements, such as the image signal processor 68, by corresponding connectors so as to perform a capturing process. In other embodiments (not shown), the sensing component and the auxiliary optical component can also be disposed on the main board of the electronic device or carrier boards in other forms according to requirements of the mechanical design and the circuit layout.

Moreover, the electronic device 800 can further include, but not be limited to, a display, a control unit, a storage unit, a random-access memory (RAM), a read-only memory (ROM), or the combination thereof.

8th Embodiment

Figure 9:
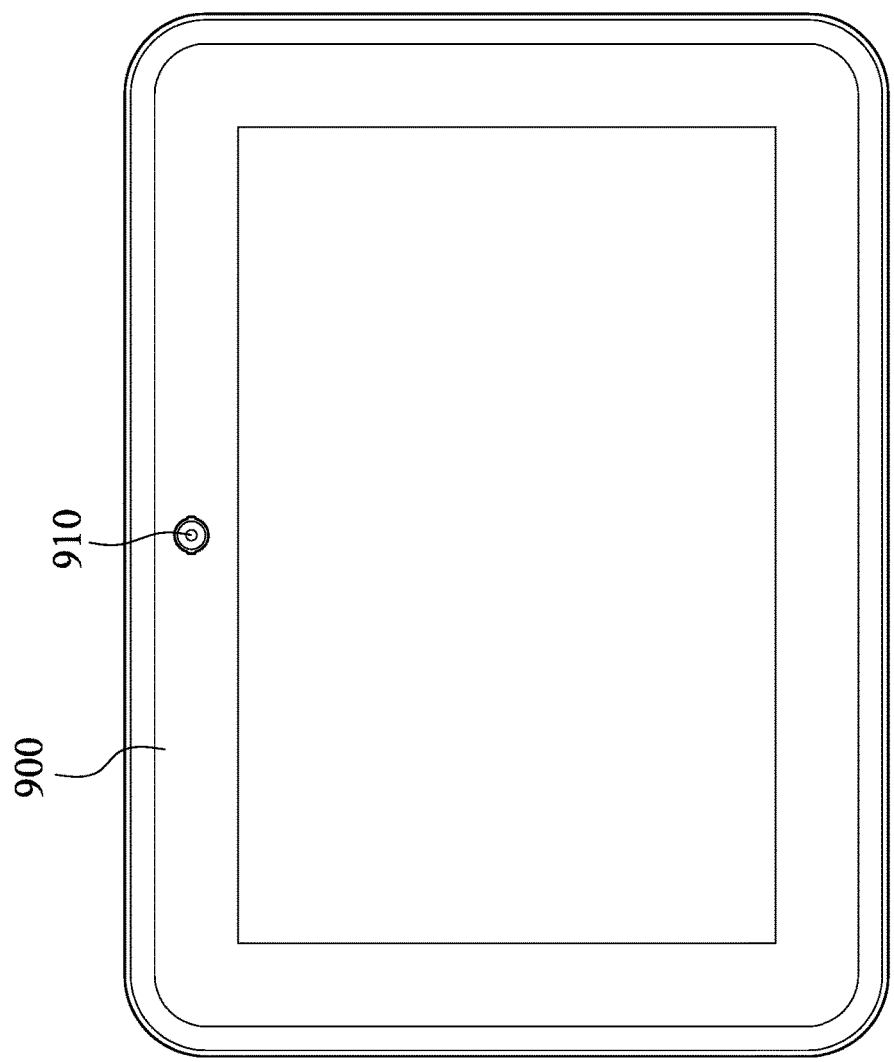
FIG. 9 is a schematic view of an electronic device according to the 8th embodiment of the present disclosure.

FIG. 9 is a schematic view of an electronic device 900 according to the 8th embodiment of the present disclosure. The electronic device 900 of the 8th embodiment is a tablet, and the electronic device 900 include a camera module 910 according the present disclosure and an image sensor (reference number is not shown), wherein the image sensor is disposed on the image surface (reference number is not shown) of the camera module 910.

9th Embodiment

Figure 10:
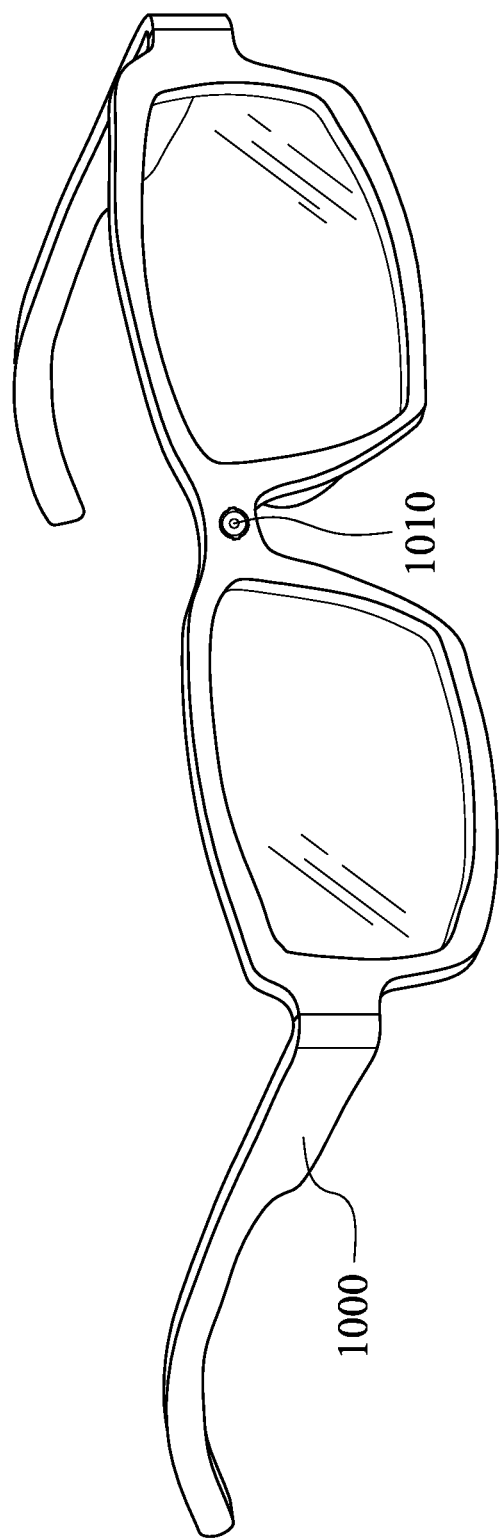
FIG. 10 is a schematic view of an electronic device according to the 9th embodiment of the present disclosure.

FIG. 10 is a schematic view of an electronic device 1000 according to the 9th embodiment of the present disclosure. The electronic device 1000 of the 9th embodiment is a wearable device, and the electronic device 1000 includes a camera module 1010 according to the present disclosure and an image sensor (reference number is not shown), wherein the image sensor is disposed on the image surface (reference number is not shown) of the camera module 1010.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens element, comprising:
   an optical effective section having an optical axis;
   an outer diameter surface surrounding the optical effective section;
   at least two cut traces, wherein each of the cut traces is shrunk from an outer diameter reference plane of the outer diameter surface toward a center of the imaging lens element; and
   at least two clearance surfaces connected between each of the cut traces and the outer diameter surface, respectively;
   wherein at least one of the cut traces comprises a first surface, and a curvature center of the first surface is closer to the center of the imaging lens element than the first surface to the center of the imaging lens element thereto;
   wherein each of the cut traces has a surface center, a first connecting line is defined between the surface center of one of the cut traces and the optical axis, a second connecting line is defined between the surface center of another of the cut traces and the optical axis, each of the first connecting line and the second connecting line is perpendicular to the optical axis, an angle between the first connecting line and the second connecting line is θ1, a curvature radius of the first surface is r, a curvature radius of the outer diameter surface is R, and the following conditions are satisfied:

$0.60 < r/R < 1.35$; and $90 \text{ degrees} < \theta1 \leq 180 \text{ degrees}$.

2. The imaging lens element of claim 1, wherein the optical effective section comprises a second surface being from concave in a paraxial region thereof to convex in a peripheral region thereof.

3. The imaging lens element of claim 2, wherein each of the clearance surfaces comprises a plane and a third surface having a curvature radius.

4. The imaging lens element of claim 2, wherein each of the clearance surfaces is shrunk from the outer diameter reference plane toward the center of the imaging lens element.

5. The imaging lens element of claim 1, wherein the imaging lens element is made by a single-molded process and comprises only one injection inlet.

6. The imaging lens element of claim 2, wherein a central thickness of the imaging lens element is CT, a diameter of the outer diameter surface is ϕ, and the following conditions are satisfied:

$CT < 1.8$ mm, and $\phi < 12$ mm.

7. The imaging lens element of claim 2, wherein a central thickness of the imaging lens element is CT, and the following condition is satisfied:

$0.25 \text{ mm} < CT < 0.95 \text{ mm}$.

8. The imaging lens element of claim 7, wherein the central thickness of the imaging lens element is CT, and the following condition is satisfied:

$0.25 \text{ mm} < CT < 0.70 \text{ mm}$.

9. The imaging lens element of claim 2, wherein the optical effective section further comprises an object-side optical effective section and an image-side optical effective section, a diameter of the object-side optical effective section is ϕi1, a diameter of the image-side optical effective section is ϕi2, a diameter of the outer diameter surface is ϕ, and the following conditions are satisfied:

$0.70 < \phi i1/\phi < 1.0$; and $0.70 < \phi i2/\phi < 1.0$.

10. The imaging lens element of claim 9, wherein the diameter of the object-side optical effective section is ϕi1, the diameter of the image-side optical effective section is ϕi2, the diameter of the outer diameter surface is ϕ, and the following conditions are satisfied:

$0.74 < \phi i1/\phi < 1.0$; and $0.82 < \phi i2/\phi < 1.0$.

11. The imaging lens element of claim 2, wherein the curvature radius of the first surface is r, the curvature radius of the outer diameter surface is R, and the following condition is satisfied:

$0.72 < r/R < 1.20$.

12. The imaging lens element of claim 2, wherein the curvature radius of the outer diameter surface is R, a central thickness of the imaging lens element is CT, and the following condition is satisfied:

$6.0 < R/CT < 15.0$.

13. The imaging lens element of claim 2, wherein a number of the cut traces is either two or three, the cut traces are asymmetrically disposed on the outer diameter surface, and not all distances between every two of the cut traces are equal to each other.

14. A camera module, comprising:
    the imaging lens element of claim 1.

15. An electronic device, comprising:
    the camera module of claim 14; and
    an image sensor disposed on an image surface of the camera module.

16. An imaging lens element, comprising:
    an optical effective section having an optical axis;
    an outer diameter surface surrounding the optical effective section;
    at least two cut traces, wherein each of the cut traces is shrunk from an outer diameter reference plane of the outer diameter surface toward a center of the imaging lens element; and
    at least two clearance surfaces connected between one of the cut traces and the outer diameter surface, respectively;
    wherein each of the cut traces has a surface center, a first connecting line is defined between the surface center of one of the cut traces and the optical axis, a second connecting line is defined between the surface center of another of the cut traces and the optical axis, each of the first connecting line and the second connecting line is perpendicular to the optical axis, and an angle between the first connecting line and the second connecting line is θ1;
    wherein a diameter of the outer diameter surface is ϕ, a central thickness of the imaging lens element is CT, a maximum thickness of the imaging lens element in a peripheral region thereof is ETmax, a vertical distance between a position of the maximum thickness and the optical axis is (ϕETmax/2), and the following conditions are satisfied:

$$0.20\phi < \phi ETmax < 0.800;$$

$$1.0 < ETmax/CT < 4.5; \text{ and}$$

$$90 \text{ degrees} < \theta 1 \leq 180 \text{ degrees}.$$

17. The imaging lens element of claim 16, wherein the optical effective section further comprises an object-side optical effective section and an image-side optical effective section, a diameter of the object-side optical effective section is ϕi1, a diameter of the image-side optical effective section is ϕi2, a diameter of the outer diameter surface is ϕ, and the following conditions are satisfied:

$$0.70 < \phi i1/\phi < 1.0; \text{ and}$$

$$0.70 < \phi i2/\phi < 1.0.$$

18. The imaging lens element of claim 17, wherein a maximum of widths of the cut traces is Wmax, a minimum of the widths of the cut traces is Wmin, and the following condition is satisfied:

$$1.25 < Wmax/Wmin < 3.5.$$

19. The imaging lens element of claim 17, wherein the position of the maximum thickness is disposed located in the optical effective section.

20. A camera module, comprising:
the imaging lens element of claim 16.

21. An electronic device, comprising:
the camera module of claim 20; and
an image sensor disposed on an image surface of the camera module.

22. An imaging lens element, comprising:
an optical effective section having an optical axis;
an outer diameter surface surrounding the optical effective section;
at least two cut traces, wherein each of the cut traces is shrunk from an outer diameter reference plane of the outer diameter surface toward a center of the imaging lens element; and
at least two clearance surfaces connected between each of the cut traces and the outer diameter surface, respectively;
wherein the optical effective section comprises a surface being from concave in a paraxial region thereof to convex in a peripheral region thereof;
wherein a diameter of the outer diameter surface is ϕ, a maximum thickness of the imaging lens element in a peripheral region thereof is ETmax, a vertical distance between a position of the maximum thickness and the optical axis is (ϕETmax/2), and the following condition is satisfied:

$$0.20\phi < \phi ETmax < 0.80 \phi.$$

23. The imaging lens element of claim 22, wherein the imaging lens element is made by a single-molded process and comprises only one injection inlet.

24. The imaging lens element of claim 22, wherein a central thickness of the imaging lens element is CT, the diameter of the outer diameter surface is ϕ, and the following conditions are satisfied:

$$CT < 1.8 \text{ mm, and}$$

$$\phi < 12 \text{ mm}.$$

25. The imaging lens element of claim 24, wherein the central thickness of the imaging lens element is CT, and the following condition is satisfied:

$$CT < 0.70 \text{ mm}.$$

26. The imaging lens element of claim 22, wherein a maximum of widths of the cut traces is Wmax, a minimum of the widths of the cut traces is Wmin, and the following condition is satisfied:

$$1.25 < Wmax/Wmin < 3.5.$$

27. The imaging lens element of claim 22, wherein a number of the cut traces is either two or three, the cut traces are asymmetrically disposed on the outer diameter surface, and not all distances between every two of the cut traces are equal to each other.

28. The imaging lens element of claim 22, wherein the optical effective section further comprises an object-side optical effective section and an image-side optical effective section, a diameter of the object-side optical effective section is ϕi1, a diameter of the image-side optical effective section is ϕi2, and the following conditions are satisfied:

$$\phi ETmax < \phi i1; \text{ and}$$

$$\phi ETmax < \phi i2.$$

29. A camera module, comprising:
the imaging lens element of claim 22.

30. An electronic device, comprising:
the camera module of claim 29; and
an image sensor disposed on an image surface of the camera module.

* * * * *